United States Patent
Iyer et al.

(10) Patent No.: US 11,442,763 B2
(45) Date of Patent: Sep. 13, 2022

(54) VIRTUAL MACHINE DEPLOYMENT SYSTEM USING CONFIGURABLE COMMUNICATION COUPLINGS

(71) Applicant: Dell Products L.P., Round Rock, TX (US)

(72) Inventors: Shyamkumar T. Iyer, Austin, TX (US); Yogesh Varma, Austin, TX (US); Timothy M. Lambert, Austin, TX (US); William Price Dawkins, Lakeway, TX (US); Kurtis John Bowman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 16/396,022

(22) Filed: Apr. 26, 2019

(65) Prior Publication Data

US 2020/0341793 A1 Oct. 29, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,429,276 B1 | 4/2013 | Kumar et al. | |
| 2006/0155969 A1* | 7/2006 | Yoda | G06F 15/7867 712/226 |
| 2007/0271560 A1 | 11/2007 | Wahlert et al. | |
| 2013/0160014 A1* | 6/2013 | Watanabe | G06F 9/50 718/1 |
| 2014/0007097 A1 | 1/2014 | Chin et al. | |
| 2014/0277784 A1* | 9/2014 | Mick | H05K 7/20209 700/286 |
| 2020/0341786 A1* | 10/2020 | Soryal | G06F 3/0632 |

* cited by examiner

*Primary Examiner* — Eric C Wai
(74) *Attorney, Agent, or Firm* — Joseph Mencher

(57) ABSTRACT

A virtual machine deployment system includes a plurality of processing subsystems, and at least one multi-endpoint adapter device including a plurality of endpoint subsystems. A plurality of communication couplings couple each of the plurality of endpoint subsystems to at least one of the plurality of processing subsystems in order to provide a respective subset of available communication resources to each of the plurality of processing subsystems. A virtual machine deployment engine receives an instruction to deploy a virtual machine, and determines at least one communication resource requirement for the virtual machine. The virtual machine deployment engine then identifies a first processing subsystem that is included in the plurality of processing subsystems and that is provided a first subset of the available communication resources that satisfies the at least one communication resource requirement for the virtual machine, and deploys the virtual machine on the first processing subsystem.

17 Claims, 15 Drawing Sheets

VIRTUAL MACHINE DEPLOYMENT SYSTEM USING CONFIGURABLE COMMUNICATION COUPLINGS

BACKGROUND

The present disclosure relates generally to information handling systems, and more particularly to deploying virtual machines provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, server devices, are sometimes utilized to provide virtual machines, which one of skill in the art will recognize are emulations of computer systems that are based on computer architectures, and that provides the functionality of physical computer systems. For example, virtual machines may provide the functionality needed to execute entire operating systems, with a hypervisor in the server device utilizing native execution to share and manage hardware in the server device, allowing for the provisioning of multiple environments which are isolated from each other while also being provided on the same server device. Virtual machines may be deployed on server devices when they are needed, and then removed from the server devices when they are no longer needed, which can result in a dynamic server device environment in which virtual machines are deployed and removed regularly while utilizing different resources in that server device over time. As more virtual machines and/or virtual machines with resource intensive requirements are provided for deployment on server devices, the deployment of those virtual machines can raise issues with regard to ensuring that each virtual machine that is deployed has access to sufficient resources in the server device in order to satisfy Service Level Agreements (SLAB) and/or other virtual machine performance requirements. This can be particularly true for server devices with particular configurations.

For example, some server devices include multiple processors and utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. Furthermore, such server devices may be provided with multi-endpoint adapter devices that provide a plurality of endpoints (e.g., PCIe endpoints), and in a specific example the endpoints may include Network Interface Controllers (NICs). Conventionally, the processors are coupled to the multi-endpoint adapter devices with fixed communication couplings which, using the specific example provided above, allows at least some of the processors to communicate with the NICs to utilize communication resources available in the server device.

In such server devices, virtual machines may be deployed on the server device by copying virtual machine code for that virtual machine to the local memory provided for a particular processor, and then having that processor execute that virtual machine code in order to provide that virtual machine. However, if that virtual machine requires a relatively high communication bandwidth (e.g., according to an SLA), and the fixed communication coupling between that processor and a NIC provides a communication resource that is not capable of that relatively high communication bandwidth, the virtual machine will fail to satisfy its virtual machine performance requirements. Furthermore, if a plurality of virtual machines are provided by the processors in a server device similarly as discussed above, available communication resources in the server device may be insufficient to deploy a relatively resource-intensive virtual machine on that server device, even if one or more of the plurality of virtual machines currently deployed on the server device do not needed the communication resources that are currently allocated to the processors that are providing them.

Accordingly, it would be desirable to provide an improved virtual machine deployment system.

SUMMARY

According to one embodiment, an Information Handling System (IHS) includes a virtual machine deployment processing system; and a virtual machine deployment memory system that is coupled to the virtual machine deployment processing system and that includes instructions that, when executed by the virtual machine deployment processing system, cause the virtual machine deployment processing system to provide a virtual machine deployment engine that is configured to: receive a first instruction to deploy a first virtual machine: determine at least one first communication resource requirement for the first virtual machine; identify a first processing subsystem that is included in a plurality of processing subsystems and that is provided a first subset of available communication resources via a plurality of communication couplings that couple the first processing subsystem to a first endpoint subsystem provided on a multi-endpoint adapter device; wherein the first subset of available communication resources satisfy the at least one first communication resource requirement for the first virtual machine; and deploy the first virtual machine on the first processing subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
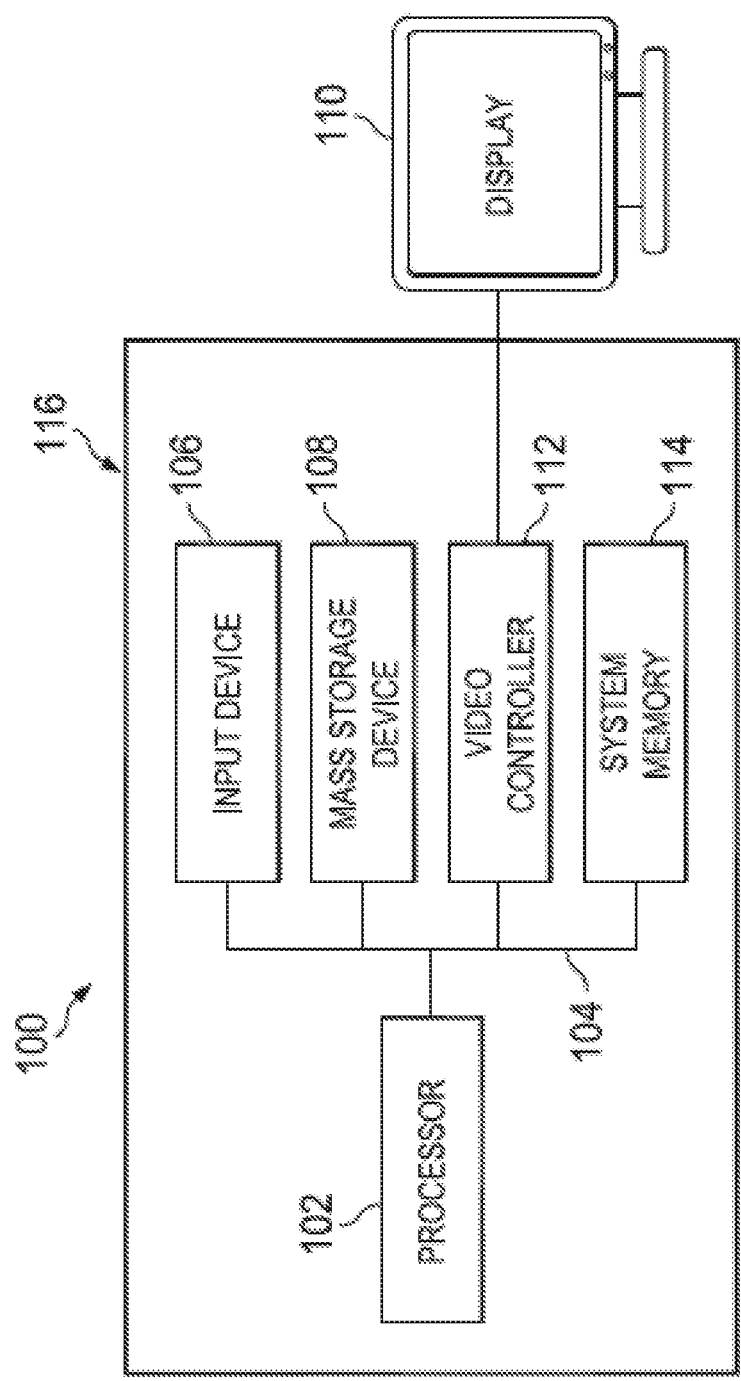
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
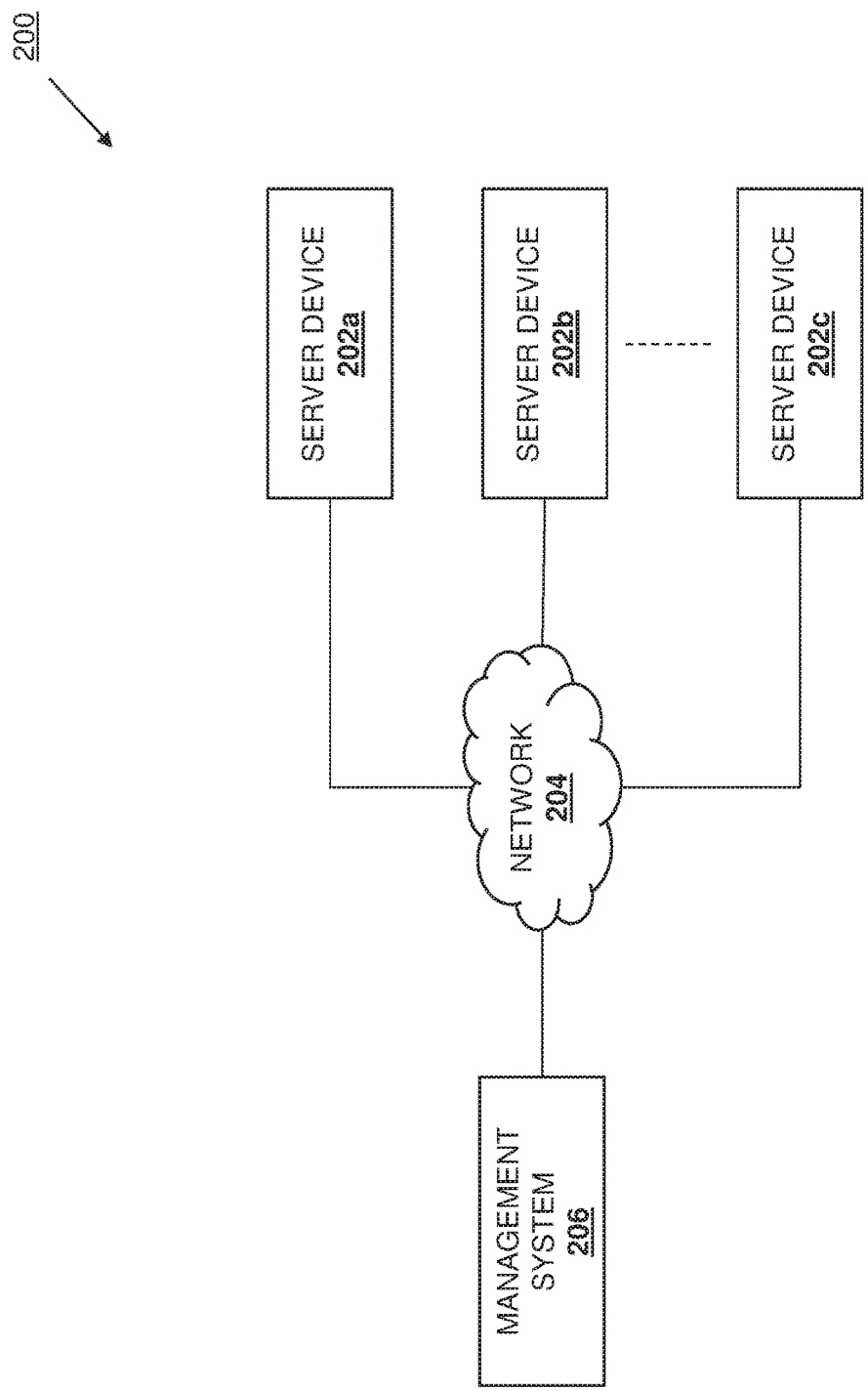
FIG. 2 is a schematic view illustrating an embodiment of a networked system including a plurality of server devices coupled to a management system via a network.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-202c may be provided by the IHS 100 discussed above with reference to FIG. 1, and/or may include some or all of the components of the IHS 100. However, while illustrated and discussed as server devices; one of skill in the art in possession of the present disclosure will recognize that the virtual machine deployment system of the present disclosure may be provided in any device that may be configured to operate similarly as discussed below. The server devices 202a-c are coupled to a network 204 that may be provided by a Local Area Network (LAN), the Internet, and/or other networks known in the art. A management system 206 is also coupled through the network 204 to the server devices 202a-c. The management system 206 may be provided by the IHS 100 discussed above with reference to FIG. 1, and/or may include some or all of the components of the IHS 100. In specific examples, the management device system 206 may be provided by server devices, desktop computing devices, laptop/notebook computing devices, tablet computing devices, mobile phones, and/or any other device that may provide the management system functionality discussed below. While a few particular devices are illustrated, one of skill in the art in possession of the present disclosure will recognize that many more devices may (and typically will) be provided in the networked system 200 (e.g., in a datacenter) while remaining within the scope of the present disclosure. Furthermore, while a specific networked system 200 has been illustrated and described, one of skill in the art in possession of the present disclosure will recognize that the virtual machine deployment system of the present disclosure may include a variety of components and component configurations while remaining within the scope of the present disclosure as well.

Figure 3:
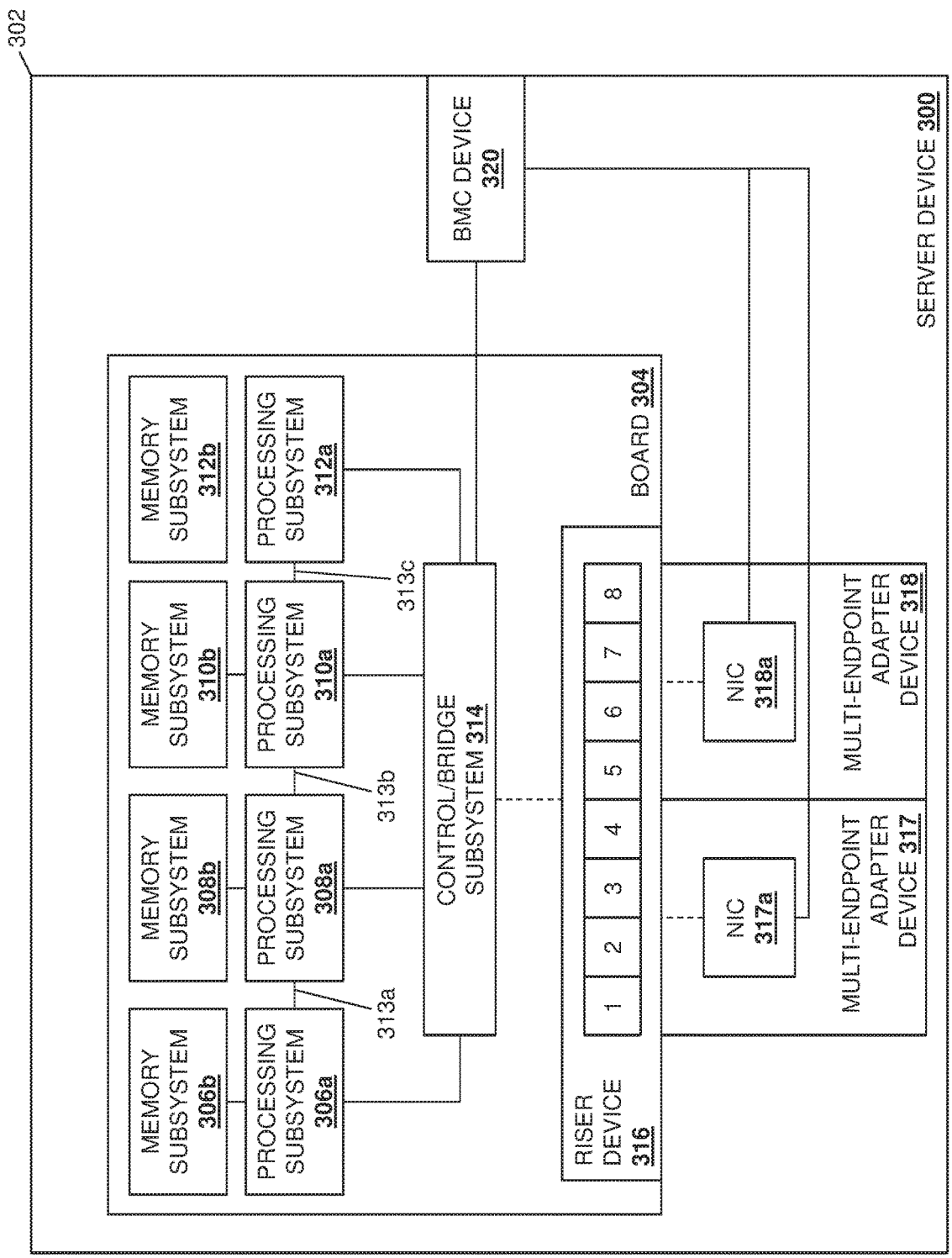
FIG. 3 is a schematic view illustrating an embodiment of a server device that may be included in the networked system of FIG. 2, and that may provide the virtual machine deployment system of the present disclosure.

Referring now to FIG. 3, an embodiment of a server device 300 is illustrated that may provide any of the server devices 202a-c discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. In the illustrated embodiment, the server device 300 includes a chassis 302 that houses the components of the server device 300, only some of which are illustrated below. For example, the chassis 302 may house a virtual machine deployment processing system (not illustrated, but which may include the processor 102 discussed above with reference to FIG. 1) and a virtual machine deployment memory system (not illustrated, but which may include the memory 114 discussed above with reference to FIG. 1) that is coupled to the virtual machine deployment processing system and that includes instructions that, when executed by the virtual machine deployment processing system, cause the virtual machine deployment processing system to provide a virtual machine deployment engine (e.g., virtual machine orchestration software and/or other virtualization software such as VSPHERE® available from VIMWARE® of Palo Alto, Calif., United States) that is configured to perform the functionality of the virtual machine deployment engines and/or virtual machine deployment subsystems discussed below.

In a specific example, the virtual machine deployment engine discussed below may be provided via an agent included in a hypervisor in the server device 300. However, in other examples, the virtual machine deployment engine discussed below may be provided via a system connected to the server device 300 (e.g., the management system 206 discussed above with reference to FIG. 2.) While a few examples of the provisioning of the virtual machine deployment engine have been described, one of skill in the art in possession of the present disclosure will recognize that the virtual machine deployment functionality discussed below may be enabled in a variety of manners and by a variety of devices or systems while remaining within the scope of the present disclosure as well.

The chassis 302 may also house a board 304 such as, for example, a motherboard and/or other circuit board that would be apparent to one of skill in the art in possession of the present disclosure. In the illustrated embodiment, a plurality of processing subsystems are provided on the board 304, including a processing subsystem 306a, a processing subsystem 308a, a processing subsystem 310a, and a processing subsystem 312a, with the processing subsystems coupled together via processing subsystem interconnects such as an Ultra-Path Interconnect (UPI). For example, in the illustrated embodiment, the processing subsystems 306a and 308a are coupled together via a UPI 313a, the processing subsystems 308a and 310a are coupled together via a UPI 313b, and the processing subsystems 310a and 312a are coupled together via a UPI 313c, Furthermore, each of the processing subsystems 306a, 308a, 310a, and 312a are provided with and connected to respective memory subsystems 306b, 308b, 310b, and 312b. For example, the processing subsystems and memory subsystems in the server device 300 may utilize a Non-Uniform Memory Access (NUMA) computer memory design in which each respective processing subsystem is connected a respective local memory subsystem to provide a respective NUMA node (i.e., the processing subsystem 306a and its local memory subsystem 306b provide a first NUMA node, the processing subsystem 308a and its local memory subsystem 308b provide a second NUMA node, and so on.) However, while four processing subsystems/memory subsystems (e.g., four NUMA nodes) are illustrated in FIG. 3, one of skill in the art in possession of the present disclosure will recognize that more or fewer processing subsystems/memory subsystems (e.g., NUMA nodes) may be provided according to the teachings of the present disclosure will falling within its scope as well.

In the illustrated embodiment, each of the processing subsystems 306a, 308a, 310a, and 312a are coupled to a control/bridge subsystem 314 that may be provided on the board 304. While illustrated and described as a control/bridge subsystem, one of skill in the art in possession of the present disclosure will recognize that other subsystems may perform the functionality of the control/bridge subsystem 314 discussed below while remaining within the scope of the present disclosure as well. In the illustrated embodiment, the control/bridge subsystem 314 may be provided by hardware on the board 304 that is coupled to a riser device 316 that is included on the board 304. However, in other embodiments, the control/bridge subsystem 314 may be provided as part of the riser device 316 while remaining within the scope of the present disclosure as well In some examples, as discussed in further detail below, the coupling between the control/bridge subsystem 314 and the riser device 316 may be configurable (as indicated by the dashed line provided for that coupling in FIG. 3.) In the illustrated embodiment, the riser device 316 may include two ×16 connectors (e.g., PCIe connectors) that provide the eight ×4 connectors illustrated in FIG. 3 (e.g., numbered "1", "2", "3", and "4" for the first ×16 connector, and "5", "6", "7", and "8" for the second ×16 connector).

In the illustrated embodiment, a pair of multi-endpoint adapter devices 317 and 318 are coupled to the riser device 316 (e.g., via the two ×16 connectors provided on the riser device 316 as discussed above), and includes a plurality of endpoint subsystems that are coupled to the riser device 316. For example, and as discussed in further detail below, the coupling between the endpoint subsystems provided on the multi-endpoint adapter devices 317 and 318 and the riser device 316 may be configurable (as indicated by the dashed line provided for those couplings in FIG. 3.) In a specific example, the endpoint subsystems provided on the multi-endpoint adapter devices 317 and 318 may be provided by physical or virtual Peripheral Component Interconnect express (PCIe) endpoints such as, for example, the Network Interface Controllers (NICs) 317a and 318a on the multi-endpoint adapter devices 317 and 318, respectively, illustrated in FIG. 3. As discussed in further detail below, the couplings between the control/bridge subsystem 314, the riser device 316, and the software defined NICs 317a and 318a provide a plurality of communication couplings that may couple each of the plurality of endpoint subsystems (e.g., each of the NICs 317a and 318a) to at least one of the plurality of processing subsystems 306a, 308a, 310a, and 312a in order to provide a respective subset of available communication resources in the server device 300 to each of the plurality of processing subsystems 306a, 308a, 310a, and 312a.

In a specific example, each of the NICs 317a and 318a provide a "multi-PCIe-endpoint device" that is configured to allow for the splitting of the resources of that NIC between multiple processing subsystems. For example, and as discussed below, each of the NICs 317a and 318a may be configured to split its respective ×16 connection to the riser device 316 into two ×8 connections to a pair of processing subsystems, or four ×4 connections to each of four processing subsystems. However, while a specific example is described, one of skill in the art in possession of the present disclosure will recognize that other endpoint subsystems having other configurable connection capabilities will fall within the scope of the present disclosure as well. However, while two multi-endpoint adapter devices 317 and 318 are illustrated, one of skill in the art in possession of the present disclosure will recognize that a single multi-endpoint adapter device with multiple endpoint subsystems (e.g., multiple NICs or PCIe endpoints) may be coupled to the control/bridge subsystem 314 while remaining within the scope of the present disclosure as well.

In the illustrated embodiment, a Baseboard Management Controller (BMC) device 320 is included in the chassis 302 and coupled to each of the control/bridge subsystem 314 as well as the NICs 317a and 318a (e.g., via the physical PCIe endpoints that provide them). For example, the BMC device 320 may be provided by an integrated DELL® Remote Access Controller (iDRAC) available from DELL® Inc. of Round Rock, Tex., United States, although other remote access controller devices and/or BMCs will fall within the scope of the present disclosure as well. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
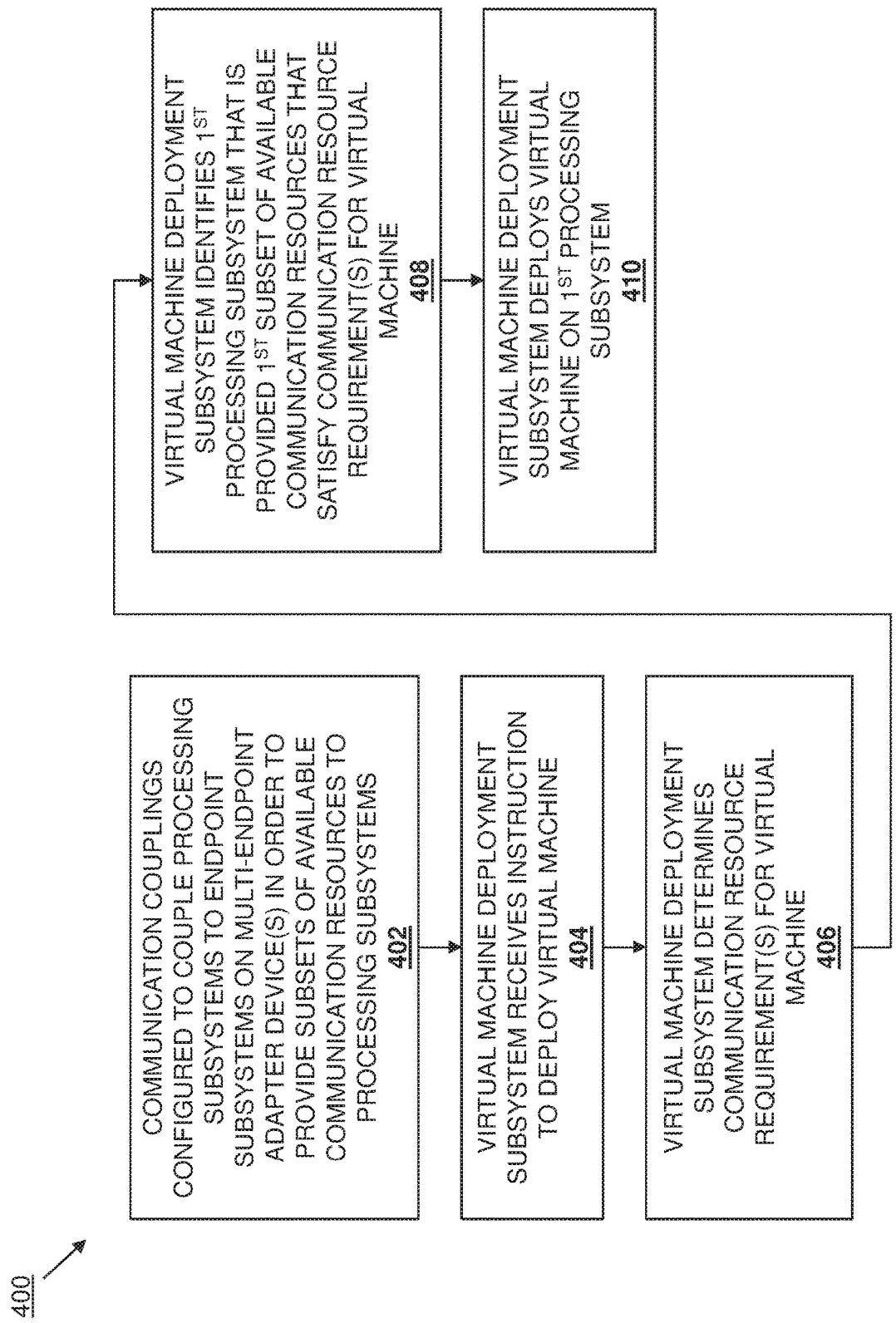
FIG. 4 is a flow chart illustrating an embodiment of a method for deploying virtual machines.

Referring now to FIG. 4, an embodiment of a method for deploying virtual machines is illustrated. As discussed below, the systems and methods of the present disclosure provide for the deployment of a first virtual machine on a first processing subsystem that has been allocated a first subset of available communication resources with a first endpoint subsystem that satisfy at least one first communication resource requirement of that first virtual machine, thus ensuring that the provisioning of that first virtual machine by that first processing subsystem will satisfy first virtual machine performance requirements for that first virtual machine. In different examples, the deployment of the first virtual machine on the first processing subsystem may include the configuration (or reconfiguration) of one or more communication couplings that couple the first processing subsystem to the first endpoint subsystem to ensure that the first processing subsystem is allocated the first subset of available communication resources with the first endpoint subsystem that satisfy the at least one first communication resource requirement of the first virtual machine, which may also include reallocating at least some communication resources that are provided to a second processing subsystem and, in some cases, moving a second virtual machine that is provided by that second processing subsystem to a different processing subsystem. As such, a more efficient deployment of virtual machines is provided that ensures that virtual machine(s) that are deployed will be able to satisfy their virtual machine performance requirement(s), while also providing for the efficient utilization of available communication resources by currently-deployed virtual machines.

Figure 5A:
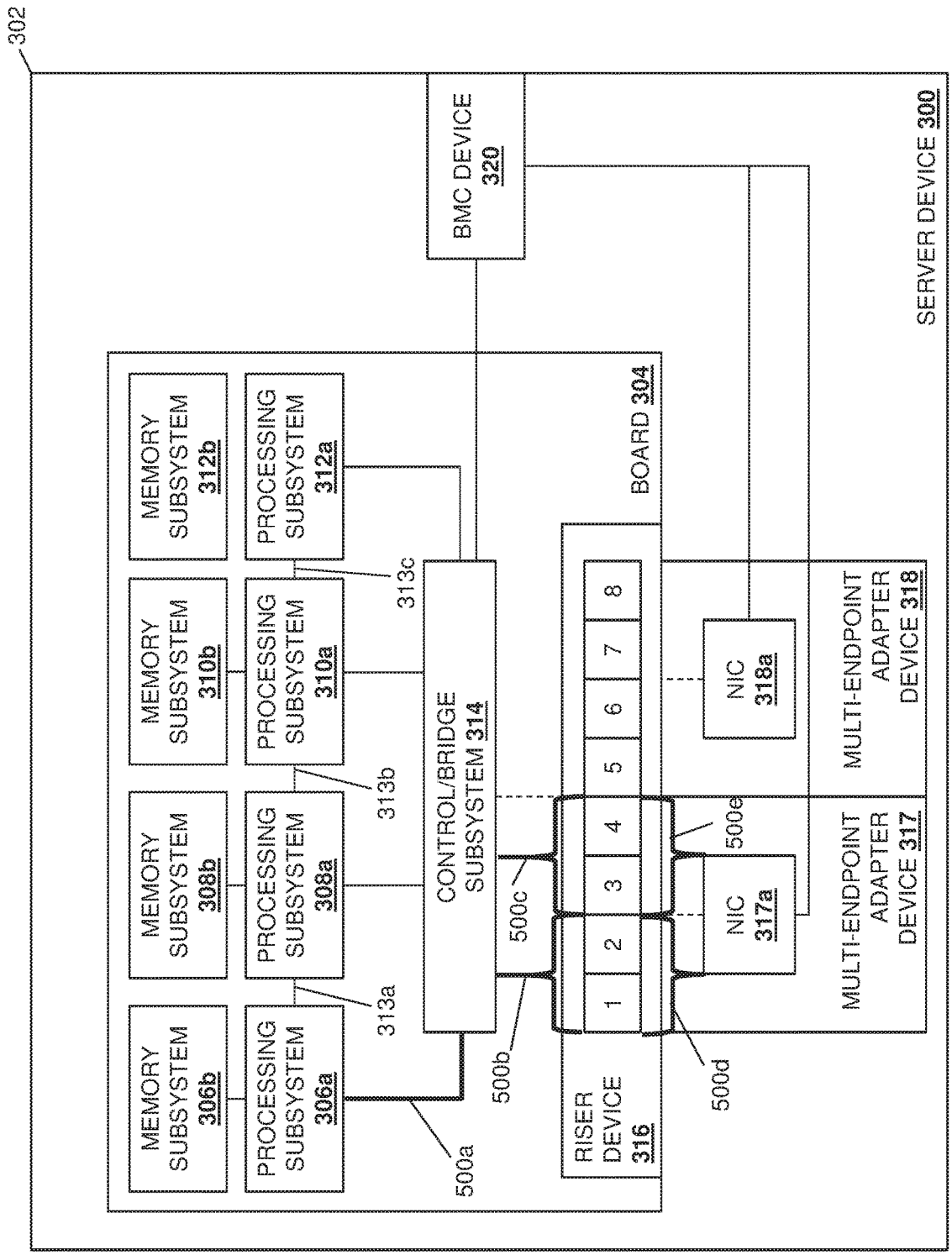
FIG. 5A is a schematic view illustrating an embodiment of a communication resource configuration in the virtual machine deployment system provided by the server device of FIG. 2 and during the method of FIG. 4.
Figure 5B:
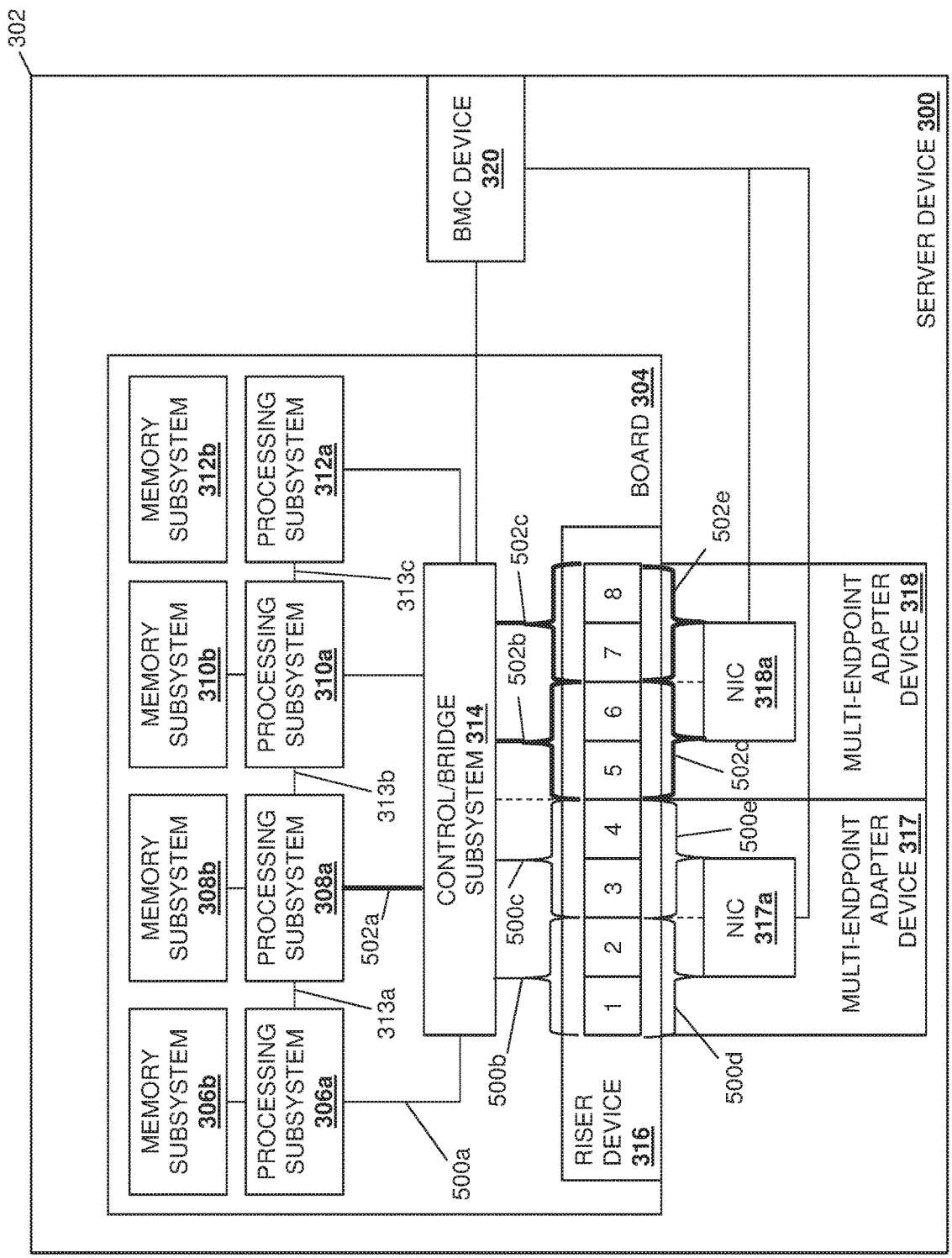
FIG. 5B is a schematic view illustrating an embodiment of a communication resource configuration in the virtual machine deployment system provided by the server device of FIG. 2 and during the method of FIG. 4.

The method 400 begins at block 402 where communication couplings are configured to couple processing subsystems to endpoint subsystems on multi-endpoint adapter device(s) in order to provide subsets of available communication resources to the processing subsystems. In an embodiment, at block 402, one or more communication couplings between the processing subsystems 306a, 308a, 310a, and 312a, the control/bridge subsystem 314, the riser device 316, and the NICs 318a and 318b may be configured. One of skill in the art in possession of the present disclosure will recognize that the configuration at block 402 may be provided as a default configuration in the server device 300 prior to the performance of the remainder of the method 400, and that other communication coupling configurations may be provided while remaining within the scope of the present disclosure as well. With reference to FIGS. 5A and 5B, a first embodiment of a communication coupling configuration is illustrated for the purposes of the examples provided below.

As illustrated in FIG. 5A, a first subset of communication resources may be provided between the processing subsystem 306a and the NIC 317a by configuring a communication coupling 500a between the processing subsystem 306a and the control/bridge subsystem 314, a communication coupling 500b between the control/bridge subsystem 314 and two of the ×4 connectors on the riser device 316 (e.g., "1" and "2" to provide a ×8 connection), a communication coupling 500c between the control/bridge subsystem 314 and two of the ×4 connectors on the riser device 316 (e.g., "3" and "4" to provide a ×8 connection), a communication coupling 500d between the two of the ×4 connectors on the riser device 316 (e.g., "1" and "2") and the NIC 317a (e.g.; via the physical PCIe endpoint device that provides that NIC 317a), and a communication coupling 500e between the two of the ×4 connectors on the riser device 316 (e.g., "3" and "4") and the NIC 317a (e.g., via the physical PCIe endpoint device that provides that NIC 317a). In a specific example, the control/bridge subsystem 314 may be configured to map the NIC 317a to the processing subsystem 306a in order to provide the communication couplings 500a-500e described above, which operates to provide the processing subsystem 306a communicatively coupled to the NIC 317a via a ×16 connection (e.g., via the four ×4 connectors "1" "2", "3", and "4" on the riser device 316.)

Furthermore, as illustrated in FIG. 5B, a second subset of communication resources may be provided between the processing subsystem 308a and the NIC 318a by configuring a communication coupling 502a between the processing subsystem 308a and the control/bridge subsystem 314, a communication coupling 502b between the control/bridge subsystem 314 and two of the ×4 connectors on the riser device 316 (e.g., "5" and "6" to provide a ×8 connection), a communication coupling 502c between the control/bridge subsystem 314 and two of the ×4 connectors on the riser device 316 (e.g., "7" and "8" to provide a ×8 connection); a communication coupling 502d between the two of the ×4 connectors on the riser device 316 (e.g., "5" and "6") and the NIC 318a (e.g., via the physical PCIe endpoint device that provides that NIC 318a), and a communication coupling 502e between the two of the ×4 connectors on the riser device 316 (e.g., "7" and "8") and the NIC 318a (e.g., via the physical PCIe endpoint device that provides that NIC 318a). Similarly as discussed above, the control/bridge subsystem 314 may be configured to map the NIC 318a to the processing subsystem 308a in order to provide the communication couplings 502a-502e described above, which operates to provide the processing subsystem 308a communicatively coupled to the NIC 318a via a ×16 connection (e.g., via the four ×4 connectors "5", "6", "7", and "8" on the riser device 316.)

As will be appreciated by one of skill in the art in possession of the present disclosure, the communication coupling configuration that is illustrated in FIGS. 5A and 5B and that provides the first subset of communication resources between the processing subsystem 306a and the NIC 317a, as well as the second subset of communication resources between the processing subsystem 308a and the NIC 318a, allocates limited communication resources to the processing subsystem 310a and the processing subsystem 312a. For example, a third subset of communication resources provided to the processing subsystem 310a in FIG. 5B requires that processing subsystem 310a to utilize the UPI 313b (and/or other processing subsystem interconnect(s)) to access the processing subsystem(s) 306a and/or 308b in order to communicate with and/or via the NICs 317a and/or 318a. Similarly, a fourth subset of communication resources provided to the processing subsystem 312a in FIG. 5B requires that processing subsystem 312a to utilize the UPI 313c (and/or other processing subsystem interconnect(s)) to access the processing subsystem(s) 306a and/or 308b in order to communicate with and/or via the NICs 317a and/or 318a, As such, the default communication coupling configuration illustrated in FIGS. 5A and 5B may provide the processing subsystem 306a communicatively coupled to the NIC 317a via a ×16 connection, the processing subsystem 308a communicatively coupled to the NIC 318a via a ×16 connection, and the processing subsystems 310a and 312a limited to communicating with the NICs 317a and 318a via their UPIs and through the processing subsystems 306a and 308a, respectively. However, while a specific communication coupling configuration is illustrated as being provided, one of skill in the art in possession of the present disclosure will recognize that a variety of other communication coupling configurations may be provided that will fall within the scope of the present disclosure as well.

Figure 6A:
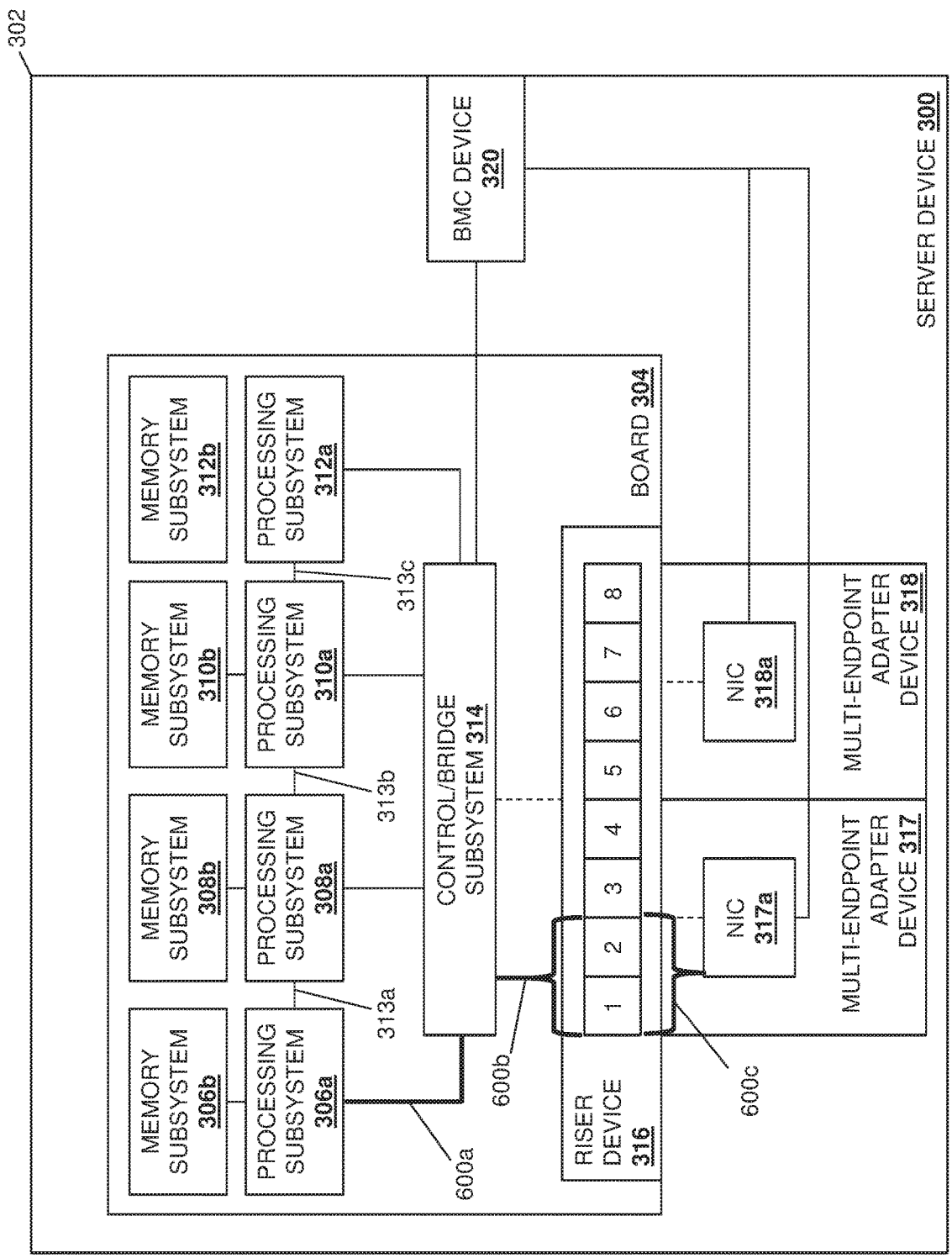
FIG. 6A is a schematic view illustrating an embodiment of a communication resource configuration in the virtual machine deployment system provided by the server device of FIG. 2 and during the method of FIG. 4.

For example, another embodiment of a communication coupling configuration is illustrated in FIGS. 6A, 6B, 6C, and 6D and provided for the purposes of the examples below. As illustrated in FIG. 6A, a first subset of communication resources may be provided between the processing subsystem 306a and the NIC 317a by configuring a communication coupling 600a between the processing subsystem 306a and the control/bridge subsystem 314, a communication coupling 600b between the control/bridge subsystem 314 and two of the ×4 connectors on the riser device 316 (e.g., "1" and "2" to provide a ×8 connection), and a communication coupling 600c between the two of the ×4 connectors on the riser device 316 (e.g., "1" and "2") and the NIC 317a (e.g., via the physical PCIe endpoint device that provides that NIC 317a). In a specific example, the control/bridge subsystem 314 may be configured to map the NIC 317a to the processing subsystem 306a in order to provide the communication couplings 600a-c described above, which operates to provide the processing subsystem 306a communicatively coupled to the NIC 317a via a ×8 connection (e.g., via the two ×4 connectors "1" and "2" on the riser device 316.)

Figure 6B:
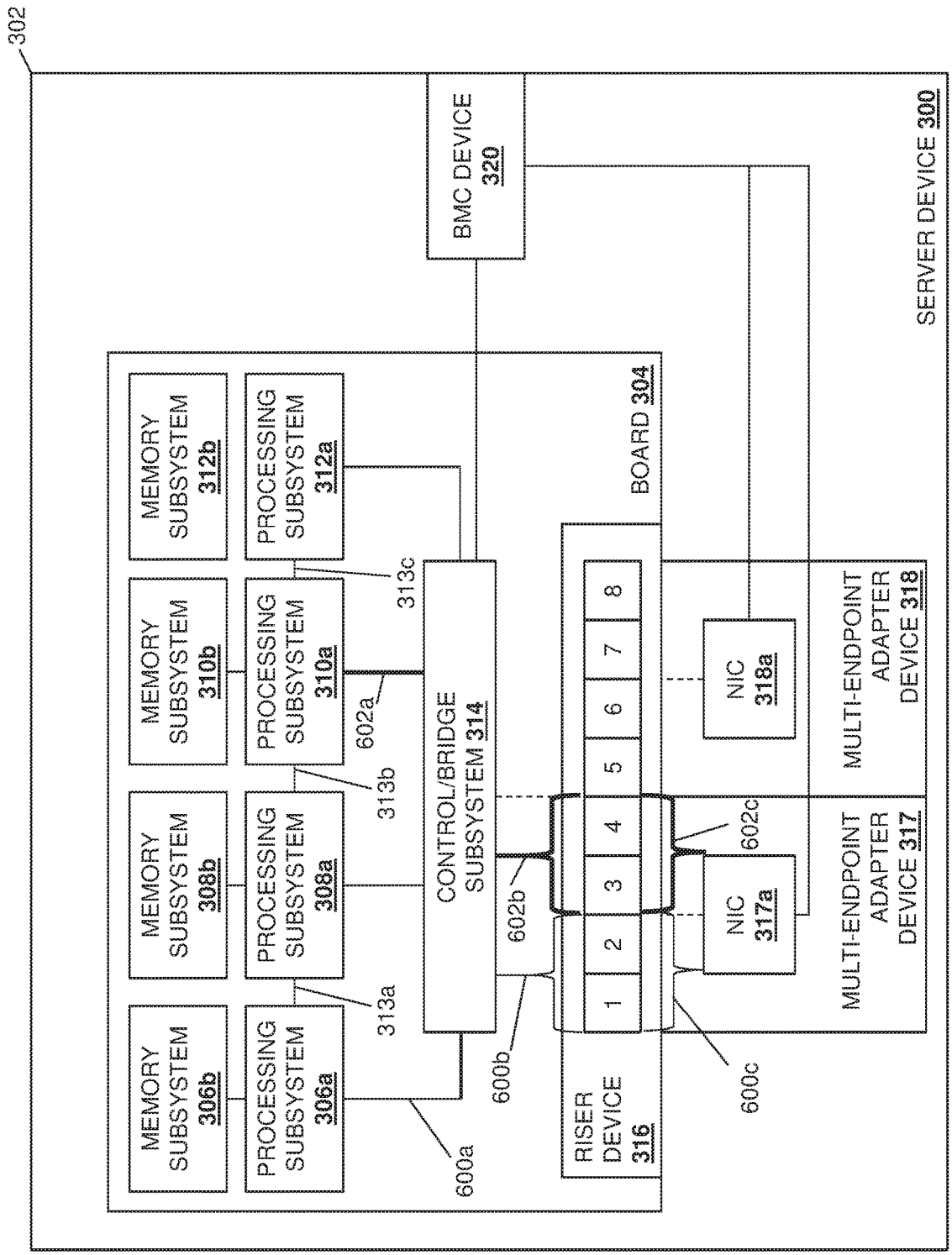
FIG. 6B is a schematic view illustrating an embodiment of a communication resource configuration in the virtual machine deployment system provided by the server device of FIG. 2 and during the method of FIG. 4.

Furthermore, as illustrated in FIG. 6B, a second subset of communication resources may be provided between the processing subsystem 310a and the NIC 317a by configuring a communication coupling 602a between the processing subsystem 310a and the control/bridge subsystem 314, a communication coupling 602b between the control/bridge subsystem 314 and two of the ×4 connectors on the riser device 316 (e.g., "3" and "4" to provide a ×8 connection), and a communication coupling 602c between the two of the ×4 connectors on the riser device 316 (e.g., "3" and "4") and the NIC 317a (e.g., via the physical PCIe endpoint device that provides that NIC 317a). Similarly as discussed above, the control/bridge subsystem 314 may be configured to map the NIC 317a to the processing subsystem 310a in order to provide the communication couplings 602a-c described above, which operates to provide the processing subsystem 310a communicatively coupled to the NIC 317a via a ×8 connection (e.g., via the two ×4 connectors "3" and "4" on the riser device 316.)

Figure 6C:
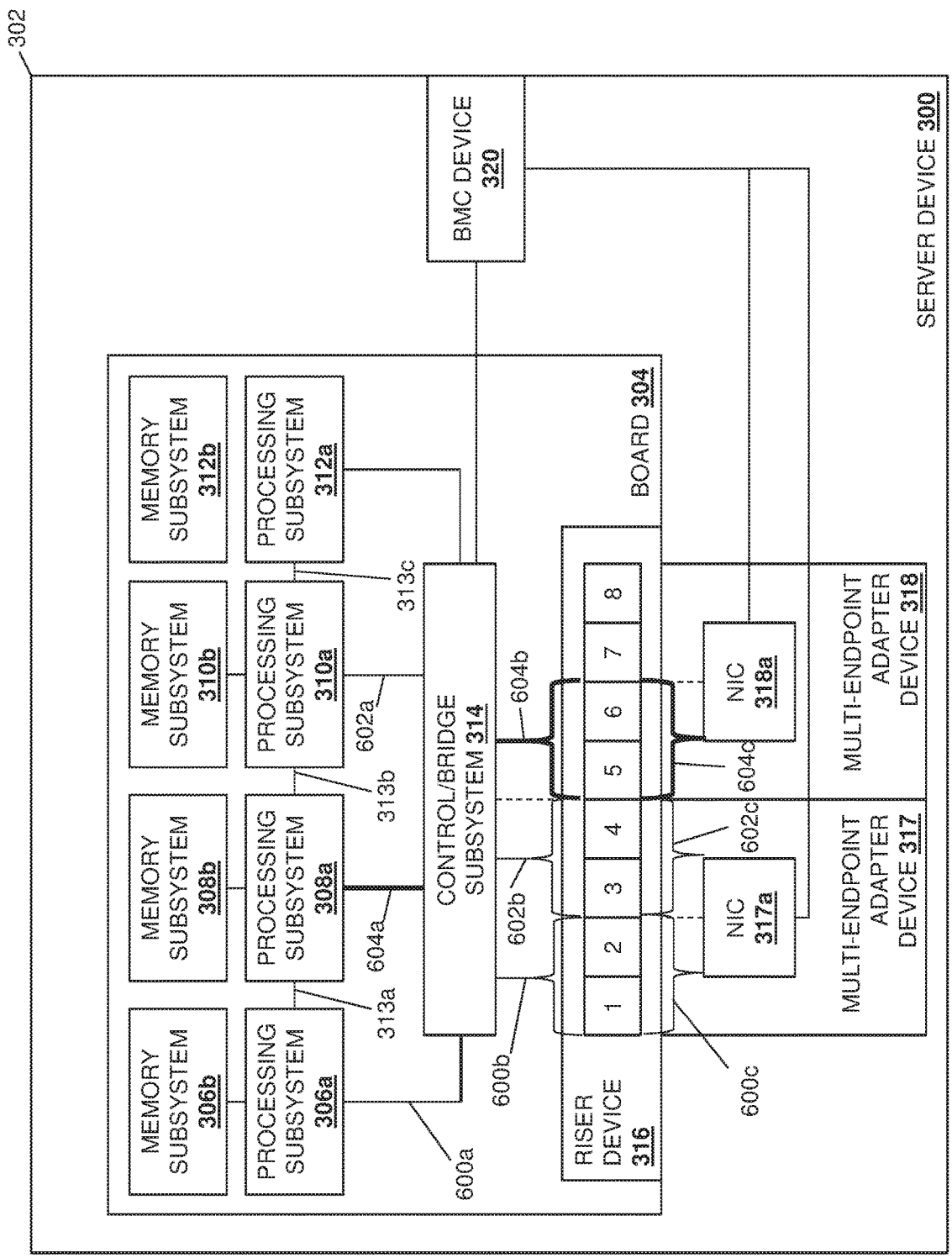
FIG. 6C is a schematic view illustrating an embodiment of a communication resource configuration in the virtual machine deployment system provided by the server device of FIG. 2 and during the method of FIG. 4.

Further still, as illustrated in FIG. 6C, a third subset of communication resources may be provided between the processing subsystem 308a and the NIC 318a by configuring a communication coupling 604a between the processing subsystem 308a and the control/bridge subsystem 314, a communication coupling 604b between the control/bridge subsystem 314 and two of the ×4 connectors on the riser device 316 (e.g., "5" and "6" to provide a ×8 connection), and a communication coupling 604c between the two of the ×4 connectors on the riser device 316 (e.g., "5" and "6") and the NIC 318a (e.g., via the physical PCIe endpoint device that provides that NIC 318a), Similarly as discussed above, the control/bridge subsystem 314 may be configured to map the NIC 318a to the processing subsystem 308a in order to provide the communication couplings 604a-c described above, which operates to provide the processing subsystem 308a communicatively coupled to the NIC 318a via a ×8 connection (e.g., via the two ×4 connectors "5" and "6" on the riser device 316.)

Figure 6D:
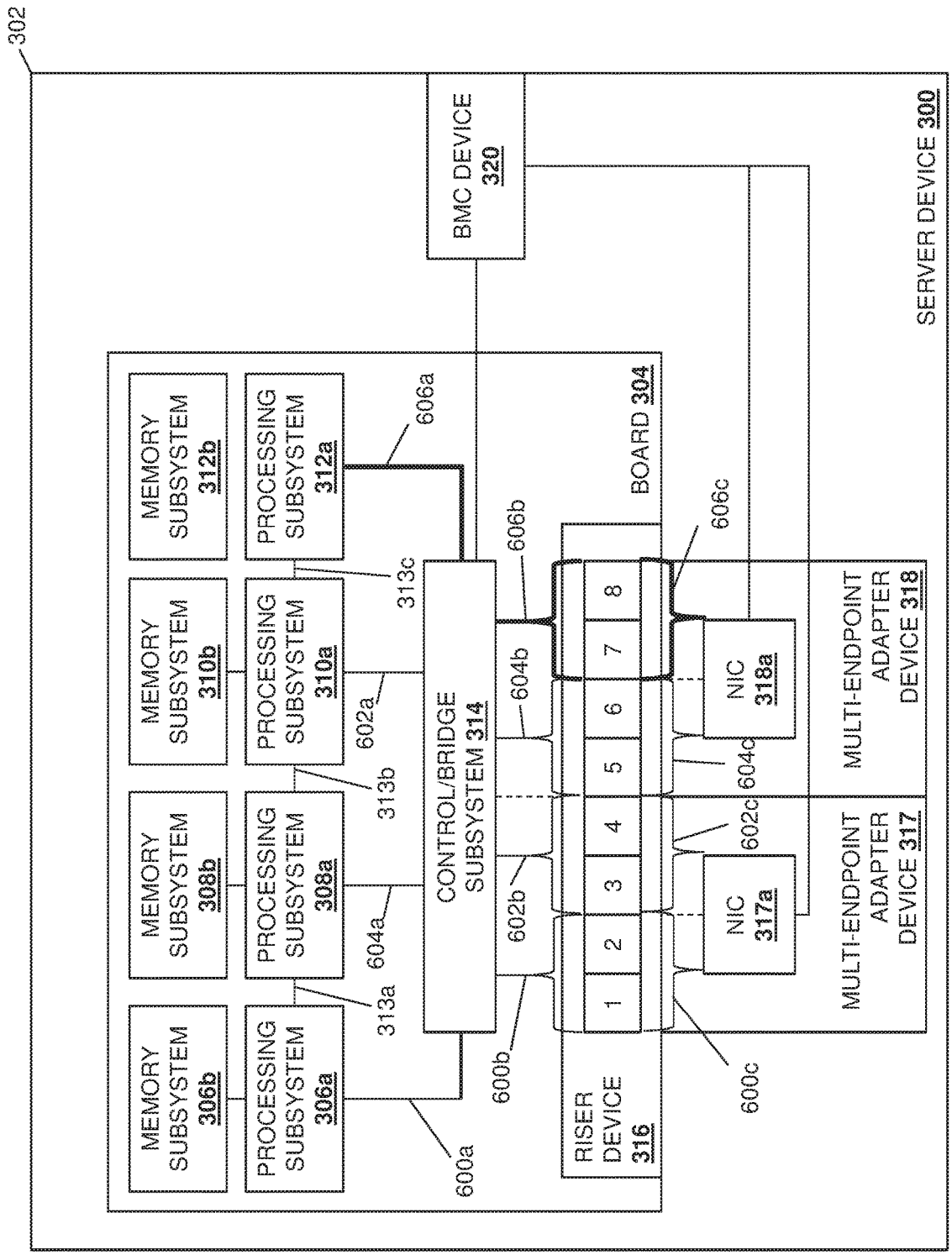
FIG. 6D is a schematic view illustrating an embodiment of a communication resource configuration in the virtual machine deployment system provided by the server device of FIG. 2 and during the method of FIG. 4.

Further still, as illustrated in FIG. 6D, a fourth subset of communication resources may be provided between the processing subsystem 312a and the NIC 318a by configuring a communication coupling 606a between the processing subsystem 312a and the control/bridge subsystem 314, a communication coupling 606b between the control/bridge subsystem 314 and two of the ×4 connectors on the riser device 316 (e.g., "7" and "8" to provide a ×8 connection), and a communication coupling 606c between the two of the ×4 connectors on the riser device 316 (e.g., "7" and "8") and the NIC 318a (e.g., via the physical PCIe endpoint device that provides that NIC 318a). Similarly as discussed above, the control/bridge subsystem 314 may be configured to map the NIC 318a to the processing subsystem 312a in order to provide the communication couplings 606a-c described above, which operates to provide the processing subsystem 312a communicatively coupled to the NIC 318a via a ×8 connection (e.g., via the two ×4 connectors "7" and "8" on the riser device 316.)

As such, in another embodiment, a default communication coupling configuration may provide the processing subsystem 306a communicatively coupled to the NIC 317a via a ×8 connection, the processing subsystem 308a communicatively coupled to the NIC 318a via a ×8 connection, the processing subsystem 310a communicatively coupled to the NIC 317a via a ×8 connection, and the processing subsystem 312a communicatively coupled to the NIC 318a via a ×8 connection. However, while a specific communication coupling configuration is illustrated as being provided at block 402, one of skill in the art in possession of the present disclosure will recognize that a variety of other communication coupling configurations may be provided that will fall within the scope of the present disclosure as well.

The method 400 then proceeds to block 404 where a virtual machine deployment subsystem receives instructions to deploy a virtual machine. In an embodiment, at block 404, the virtual machine deployment engine may receive instructions to deploy a virtual machine on the server device 202a/300 by, for example, substantiating a virtual machine on the server device 202a/300, migrating a previously deployed/existing virtual machine to the server device 202a/400 (e.g., from one of the virtual machines 202b or 202c), and/or otherwise providing for the provisioning of a virtual machine via the server device 202a/300. For example, a user of the management system 206 may generate the instructions to deploy the virtual machine, and may transmit those instructions through the network 204 to the service device 202a such that they are received by the virtual machine deployment engine provided in that server device 202a. In another example, the virtual machine deployment engine provided in the management system 206 may receive the instructions to deploy the virtual machine on the server device 202a (e.g., via an input device included on, or connected to, the management system 206) and, in response, may operate to perform the functionality discussed below. While a few examples have been provided, one of skill in the art in possession of the present disclosure will recognize that instructions to deploy a virtual machine may be generated and/or received in a variety of manners that will fall within the scope of the present disclosure as well.

The method 400 then proceeds to block 406 where the virtual machine deployment subsystem determines communication resource requirement(s) for the virtual machine. In an embodiment, at block 406, the virtual machine deployment engine may operate to determine one or more communication resource requirements for the virtual machine for which the deployment instructions were received at block 404. For example, the communication resource requirement(s) for a virtual machine provided for deployment on the server device 202a/300 may be included in the instructions to deploy that virtual machine and, as such, at block 406 the virtual machine deployment engine may operate to review the instructions to deploy the virtual machine that were received at block 404 and, in response, identify the communication resource requirements for that virtual machine. However, while a specific example of determining the communication resource requirements for a virtual machine have been described, one of skill in the art in possession of the present disclosure will recognize that the communication resource requirements for a virtual machine may be retrieved from a database (e.g., included in the management system 206, coupled to the network 204, etc.) describing communication requirements for an application type that will be run on the virtual machine being deployed, determined via instructions provided by a user deploying the virtual machine, identified via telemetry gathered by a virtualization orchestrator (e.g., from previous deployments of that virtual machine or similar virtual machines), and/or may be determined in a variety of manners that will fall within the scope of the present disclosure as well.

As such, continuing with the examples provided above with reference to FIGS. 5A and 58, at block 406 the virtual machine deployment engine may operate to review the instructions to deploy the virtual machine on the server device 300 and determine that the virtual machine provided for deployment on the servicer device 300 of FIGS. 5A and 5B includes a communication resource requirement that requires a ×16 connection to a NIC. For example, the virtual machine provided for deployment on the servicer device 300 of FIGS. 5A and 5B may be associated with an SLA that requires relatively extensive network bandwidth that can be satisfied by a ×16 connection to a NIC. Similarly, continuing with the examples provided above with reference to FIGS. 6A-6D, at block 406 the virtual machine deployment engine may operate to review the instructions to deploy the virtual machine on the server device 300 and determine that the virtual machine provided for deployment on the server device 300 of FIGS. 6A-6D includes a communication resource requirement that requires a ×16 connection to a NIC. For example, the virtual machine provided for deployment on the servicer device 300 of FIGS. 6A-6D may be associated with an SLA that requires relatively extensive network bandwidth that can be satisfied by a ×16 connection to a NIC. However, while the same specific communication resource requirement (i.e., the need for a ×16 connection to a NIC) has been provided for each of the examples discussed below, one of skill in the art in possession of the present disclosure will recognize that a variety of communication resource requirements, and/or other requirements for other types of endpoint subsystem provided/associated resources, will fall within the scope of the present disclosure as well.

The method 400 then proceeds to block 408 where the virtual machine deployment subsystem identifies a first processing subsystem that is provided a first subset of the available communication resources that satisfy the communication resource requirement(s) for the virtual machine, followed by block 410 where the virtual machine deployment subsystem deploys the virtual machine on the first processing subsystem. In an embodiment, at block 408, the virtual machine deployment engine operates to identify a processing subsystem that is provided communication resources that are sufficient to satisfy the communication resource requirements of the virtual machine for which the deployment instruction was received at block 404. As discussed in one of the examples provided below, that identification may include identifying a processing subsystem that is already provided those sufficient communication resources. However, as discussed in others of the examples provided below, that identification may be preceded by the reconfiguring of communication coupling(s) between the processing subsystems and the endpoint subsystems, the reallocation of communication resources from one or more processing subsystems to other processing subsystem(s), the movement of virtual machines from one processing subsystem to another processing subsystem, and/or other virtual machine deployment functionality that will be apparent to one of skill in the art in possession of the present disclosure.

Continuing with the example discussed above with reference to FIGS. 5A and 5B, at block 408, the virtual machine deployment engine may operate to request, retrieve, and/or receive server device configuration information about the server device 300 from the BMC device 320. As would be understood by one of skill in the art in possession of the present disclosure, the BMC device 320 (e.g., a remote access controller such as the iDRAC discussed above) may include a variety of information that describes/details how the server device 300 is configured, including information about a communication coupling configuration that details the communication coupling configuration provided between the processing subsystems 306a, 308a, 310a, and 312a and the NICs 317a and 318a, discussed above. As such, at block 408, the virtual machine deployment engine may request, retrieve, and/or receive server device configuration information that include the communication coupling configuration discussed above with reference to FIGS. 5A and 5B that details how the processing subsystem 306a is communicatively coupled to the NIC 317a via a ×16 connection, the processing subsystem 308a is communicatively coupled to the NIC 318a via a ×16 connection, and the processing subsystems 310a and 312a are limited to communicating with the NICs 317 and 318a via their UPIs 313b and 313c and via the processing subsystems 306a and 308a. However, while the retrieval and/or receiving of the communication coupling configuration from a BMC/remote access controller device has been described, one of skill in the art in possession of the present disclosure will recognize that communication coupling configurations for the server device 300 may be retrieved and/or received in a variety of manners and from a variety of subsystems while remaining within the scope of the present disclosure as well.

At block 408, the virtual machine deployment engine may then compare the communication resource requirement(s) determined for the virtual machine for which the deployment instruction was received at block 404 with the communication coupling configuration received/retrieved for the server device 300 in order to identify a processing subsystem that is provided communication resources that satisfy the communication resource requirement(s) for that virtual machine. As such, at block 408, the virtual machine deployment engine may compare the communication resource requirement for the virtual machine discussed above that requires a ×16 connection to a NIC, with the communication coupling configuration that details how the processing subsystem 306a is communicatively coupled to the NIC 317a via a ×16 connection and the processing subsystem 308a is communicatively coupled to the NIC 318a via a ×16 connection (as well as how the processing subsystems 310a and 312a must access those NICs 317a and 318a via their UPIs 313b and 313c and the processing subsystems 306a and 308a), and may then identify either of the processing subsystem 306a or 308a as being provided a subset of the available communication resources (e.g., because each includes a ×16 connection to the NICs 317a and 318a, respectively) that satisfy the communication resource requirement(s) for the virtual machine (i.e., a ×16 connection to a NIC). For the purposes of the example provided below, the virtual machine deployment engine identifies the processing subsystem 306a at block 408.

Figure 5C:
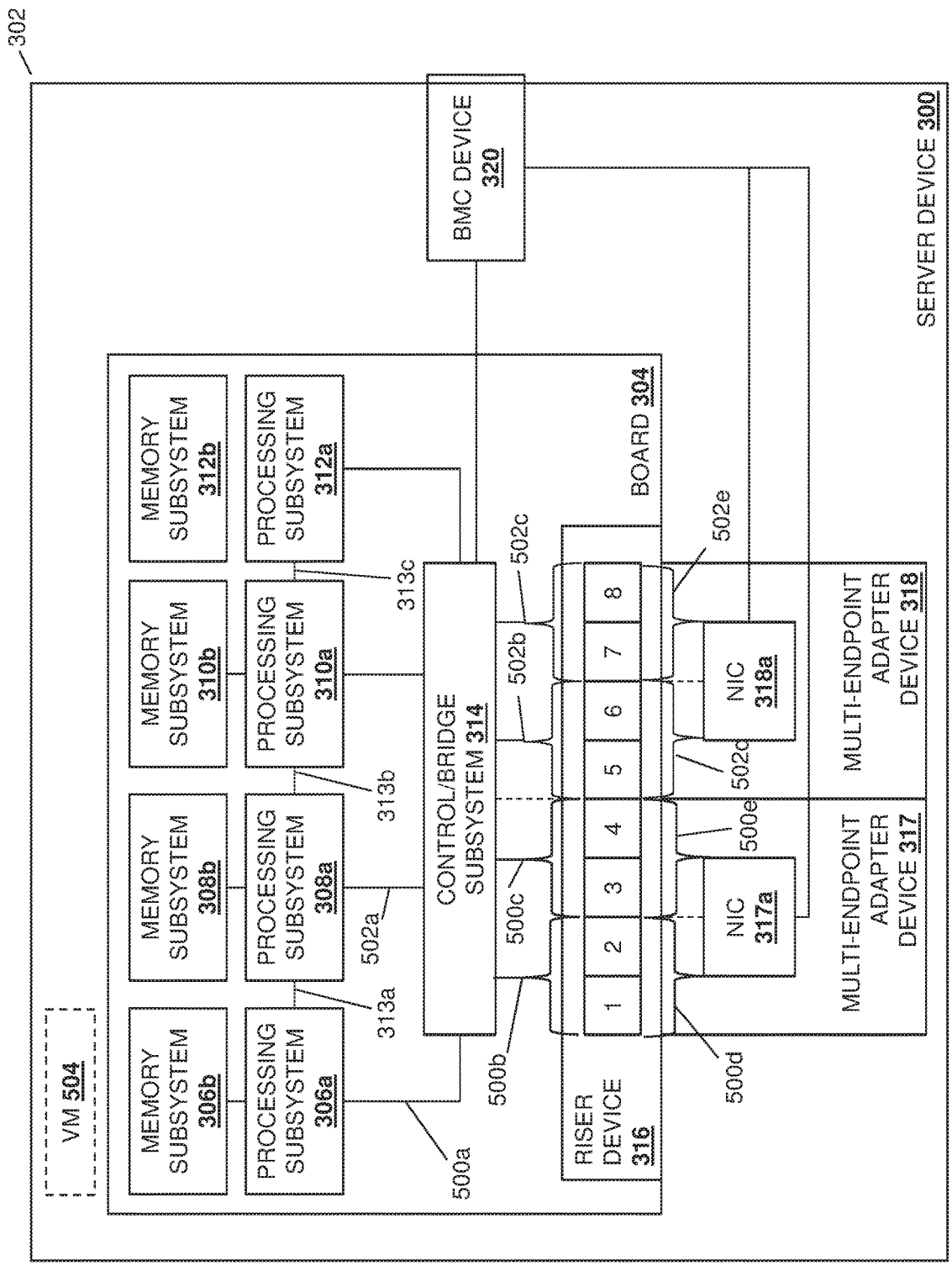
FIG. 5C is a schematic view illustrating an embodiment of a virtual machine deployed in the virtual machine deployment system provided by the server device of FIG. 2 and during the method of FIG. 4.

In an embodiment, at block 410, the virtual machine deployment engine then deploys the virtual machine for which the deployment instruction was received at block 404 on the processing subsystem identified at block 408. At at block 410, the virtual machine deployment engine may retrieve virtual machine code (for the virtual machine for which the deployment instruction was received at block 404) from, for example, the deployment instructions, a location identified in the deployment instructions, and/or in a variety of other manners that would be apparent to one of skill in the art in possession of the present disclosure. With reference to FIG. 5C, the virtual machine deployment engine may then provide that virtual machine code on the memory subsystem 306b, which allows the processing subsystem 306a to execute that virtual machine code in order to provide a virtual machine (VM) 504 (which is the virtual machine for which the deployment instruction was received at block 404.) As would be understood by one of skill in the art in possession of the present disclosure, following the deployment of the virtual machine 504, that virtual machine 504 may operate to perform a variety of virtual machine operations in a manner that satisfies its virtual machine performance requirements including, for example, communicating via the NIC 317a using the communication couplings 500a-500e (e.g., via the ×16 connection provided on the riser device 316 for the processing subsystem 306a).

Figure 6E:
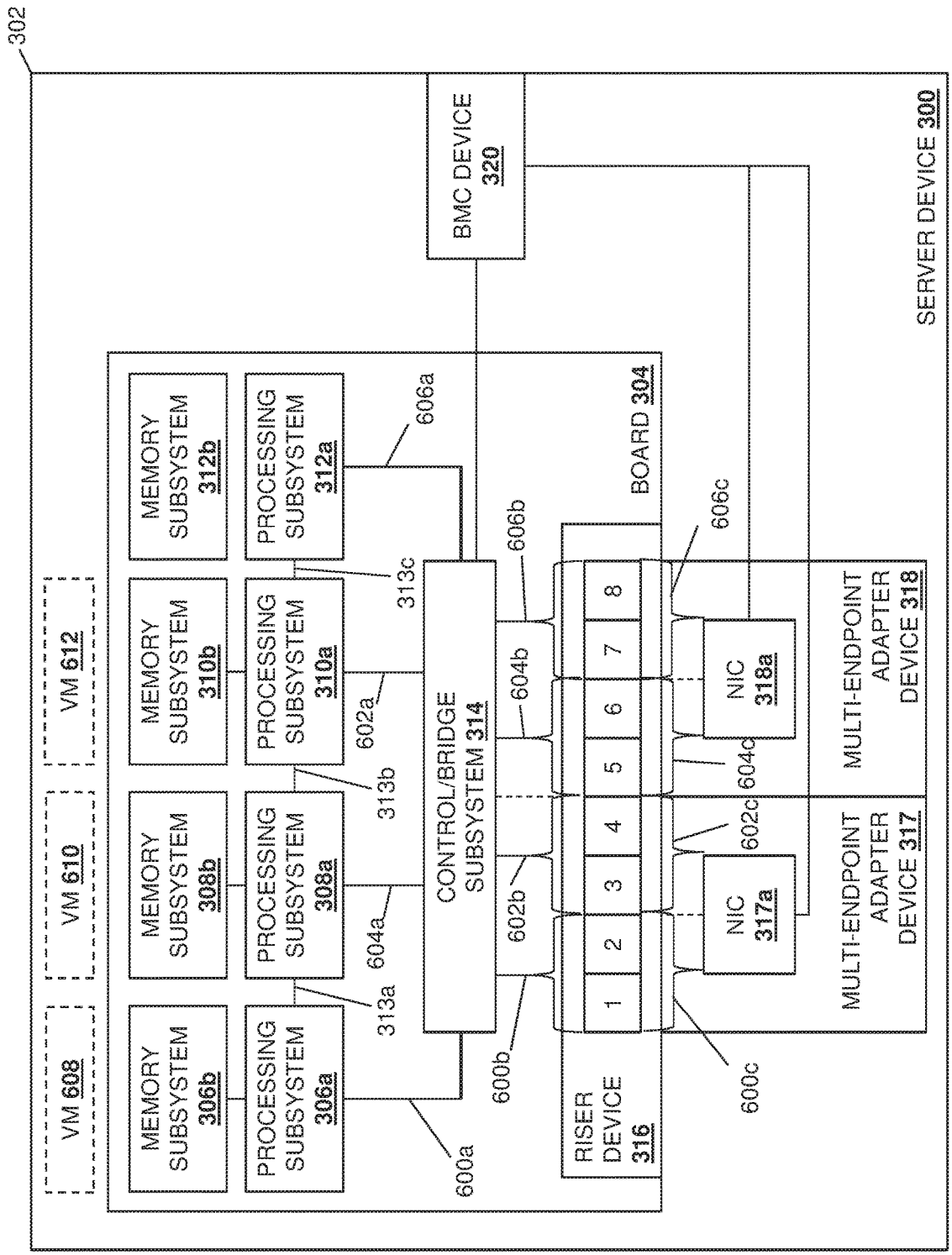
FIG. 6E is a schematic view illustrating an embodiment of virtual machines deployed in the virtual machine deployment system provided by the server device of FIG. 2 and during the method of FIG. 4.

Continuing with the example discussed above with reference to FIGS. 6A-6D, and with reference to FIG. 6E, a plurality of virtual machines (VMs) 608, 610, and 612 have been provided on the server device 300. For example, following the configuration of the communication couplings at block 402 and prior to receiving the deployment instruction for the virtual machine at block 404, the virtual machine deployment engine may have operated to retrieve virtual machine code and provide that virtual machine code on the memory subsystem 306b for execution by the processing subsystem 306a to provide a virtual machine 608, retrieve virtual machine code and provide that virtual machine code on the memory subsystem 308b for execution by the processing subsystem 308a to provide a virtual machine 610, and retrieve virtual machine code and provide that virtual machine code on the memory subsystem 310b for execution by the processing subsystem 310a to provide a virtual machine 612. However, while a specific example of previously deployed virtual machines 608, 610, and 612 is illustrated, one of skill in the art in possession of the present disclosure will recognize that virtual machines may be provided on the server device 300 in a variety of manners that will fall within the scope of the present disclosure as well.

At block 408 and similarly as discussed above, the virtual machine deployment engine may request, retrieve, and/or receive server device configuration information that include the communication coupling configuration discussed above with reference to FIGS. 6A-6D that details how the processing subsystem 306a is communicatively coupled to the NIC 317a via a ×8 connection, the processing subsystem 308a is communicatively coupled to the NIC 318a via a ×8 connection, the processing subsystem 310a is communicatively coupled to the NIC 317a via a ×8 connection, and the processing subsystem 312a is communicatively coupled to the NIC 318a via a ×8 connection. Furthermore, the server device configuration information and/or the communication coupling configuration may detail how the virtual machines 608, 610, and 612 are currently being provided by the processing subsystems 306a, 308a, and 310a, respectively. However, while the retrieval and/or receiving of the communication coupling configuration from a BMC/remote access controller device has been described, one of skill in the art in possession of the present disclosure will recognize that communication coupling configurations for the server device 300 may be retrieved and/or received in a variety of manners and from a variety of subsystems while remaining within the scope of the present disclosure as well.

At block 408, the virtual machine deployment engine may then compare the communication resource requirement(s) determined for the virtual machine for which the deployment instruction was received at block 404 with the communication coupling configuration received/retrieved for the server device 300 in order to identify a processing subsystem that is provided communication resources that satisfy the communication resource requirement(s) for that virtual machine. As such, at block 408, the virtual machine deployment engine may compare the communication resource requirement for the virtual machine discussed above that requires a ×16 connection to a NIC, with the communication coupling configuration that details how the processing subsystem 306a is currently providing the virtual machine 608 and is communicatively coupled to the NIC 317a via a ×8 connection, how the processing subsystem 308a is currently providing the virtual machine 610 and is communicatively coupled to the NIC 318a via a ×8 connection, how the processing subsystem 310a is currently providing the virtual machine 612 and is communicatively coupled to the NIC 317a via a ×8 connection, and how the processing subsystem 312a is not currently providing a virtual machine and is communicatively coupled to the NIC 318a via a ×8 connection, and may then determine that none of the processing subsystems 306a, 308a, 310a, and 312a is currently being provided communication resources that satisfy the communication resource requirement(s) for the virtual machine (i.e., each is provided a ×8 connection to the NICs 317a and 318a that will not satisfy the requirement for a ×16 connection to a NIC).

As such, in this embodiment, the virtual machine deployment engine may determine that at least some of the plurality of communication couplings should be reconfigured in order to provide a processing subsystem with communication resources that will satisfy the communication resource requirements of the virtual machine for which the deployment instruction was received at block 404. In an embodiment of block 408, the virtual machine deployment engine may determine that one or more of the processing subsystems does not require the communication resources (or at least some of the communication resources) that it is currently being provided. For example, with reference to FIG. 6E, the virtual machine deployment engine may determine that the virtual machine 610 does not require the ×8 connection provided by the communication couplings 604a, 604b, and 604c (and the two ×4 connectors "5" and "6" on the riser device 316) to the NIC 318b. Similarly as discussed above, the determination of the communication resource requirements for the virtual machine 610 in order to determine that the virtual machine 610 does not require the ×8 connection discussed above may be retrieved from a deployment instruction that was received for the virtual machine 610. However, in other examples, the virtual machine deployment engine may review the operation of the virtual machine 610 after it was deployed on the processing subsystem 308a and determine that that operation does not require the ×8 connection discussed above. While a few specific examples have been provided, one of skill in the art in possession of the present disclosure will recognize that virtual machine communication resource requirements may be determined in a variety of manners that will fall within the scope of the present disclosure as well.

Figure 6F:
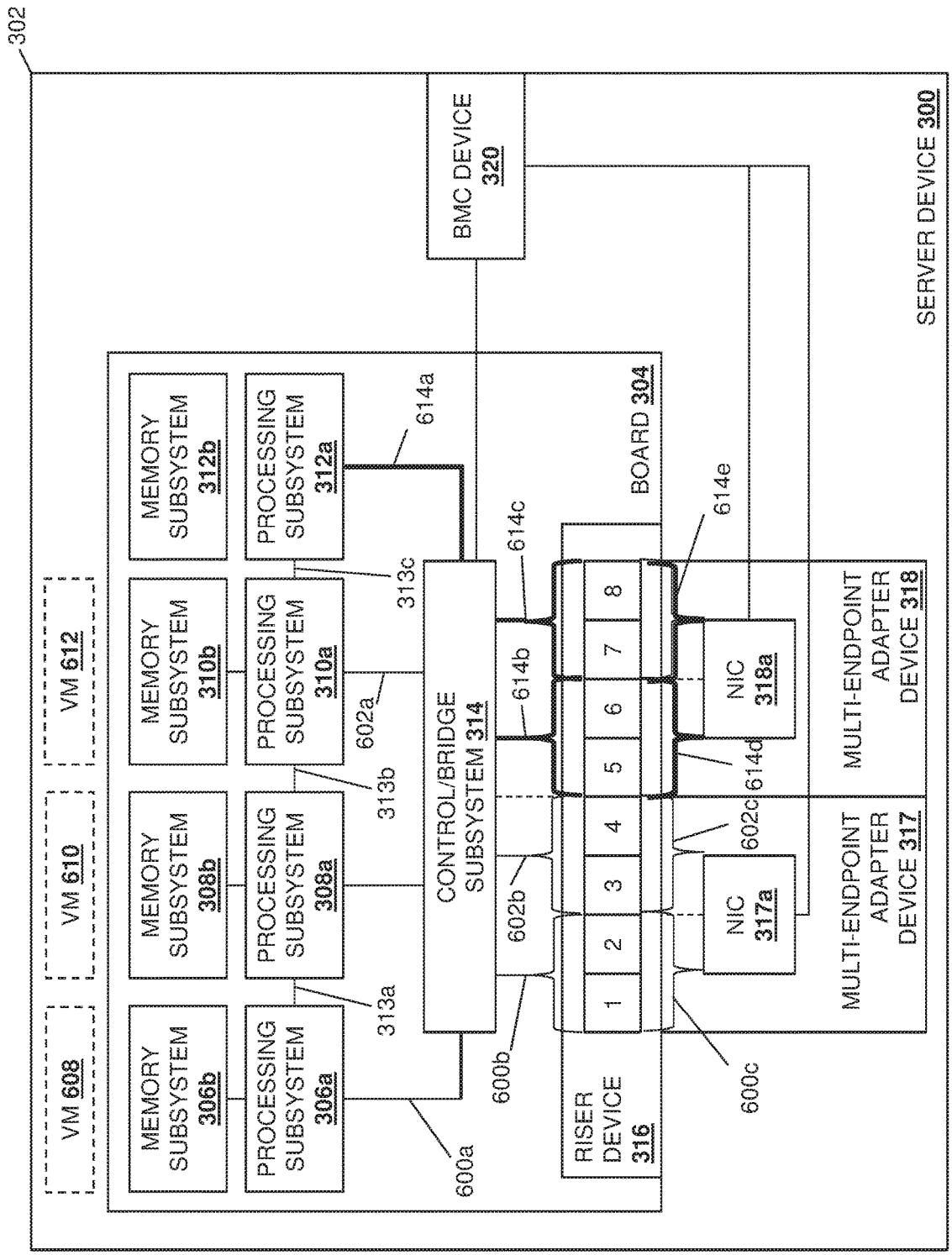
FIG. 6F is a schematic view illustrating an embodiment of a communication resource reconfiguration in the virtual machine deployment system provided by the server device of FIG. 2 and during the method of FIG. 4.

With reference to FIG. 6F, the virtual machine deployment engine may then reconfigure the plurality of communication couplings in order to configure a communication coupling 614a between the processing subsystem 312a and the control/bridge subsystem 314, a communication coupling 614b between the control/bridge subsystem 314 and two of the ×4 connectors on the riser device 316 (e.g., "5" and "6" to provide a ×8 connection), a communication coupling 614c between the control/bridge subsystem 314 and two of the ×4 connectors on the riser device 316 (e.g., "7" and "8" to provide a ×8 connection), a communication coupling 614d between the two of the ×4 connectors on the riser device 316 (e.g., "5" and "6") and the NIC 318a (e.g., via the physical PCIe endpoint device that provides that NIC 318a), and a communication coupling 614e between the two of the ×4 connectors on the riser device 316 (e.g., "7" and "8") and the NIC 318a (e.g., via the physical PCIe endpoint device that provides that NIC 318a). Similarly as discussed above, the control/bridge subsystem 314 may be reconfigured to remap the NIC 318a to the processing subsystem 312a in order to provide the communication couplings 614a-614e described above, which operates to provide the processing subsystem 312a communicatively coupled to the NIC 318a via a ×16 connection (e.g., via the four ×4 connectors "5", "6", "7", and "8" on the riser device 316.) In some embodiments, the reconfiguration of the communication couplings by the virtual machine deployment engine may include providing instruction(s) to the BMC device 320 to perform some or all of the communication coupling reconfigurations, along with the BMC device 320 performing some or all of those reconfigurations. As such, the processing subsystem 312a is provided communication resources sufficient to satisfy the communication resource requirements for the virtual machine for which the deployment instruction was received at block 404, and may be identified as such at block 408.

Furthermore, one of skill in the art in possession of the present disclosure will recognize that the reconfiguration has removed the communication coupling 604a between the processing subsystem 308a and the NIC 318a and, as such, the processing subsystem 308a is now required to use the UPIs 313a and/or 313b in order to communicate via those NICs 317a and 318a. While the embodiment of FIG. 6F illustrates the communication couplings 604b, 604c, 606a, 606b, and 606c having been replaced with the communication couplings 614a-614e, one of skill in the art in possession of the present disclosure will recognize that the reconfiguration of communication couplings according to the teachings of the present disclosure may not necessarily remove communication couplings and replace them with other communication couplings, but instead may redirect those communication couplings to provide for the allocation of communication resources in the manner discussed above (e.g., the "removal" of the communication coupling 604a may simply configure other communication couplings such that the communication coupling 604a is no longer configured to couple via a direct path through the riser device 316 to either of the NICs 317a and 318a.)

Figure 6G:
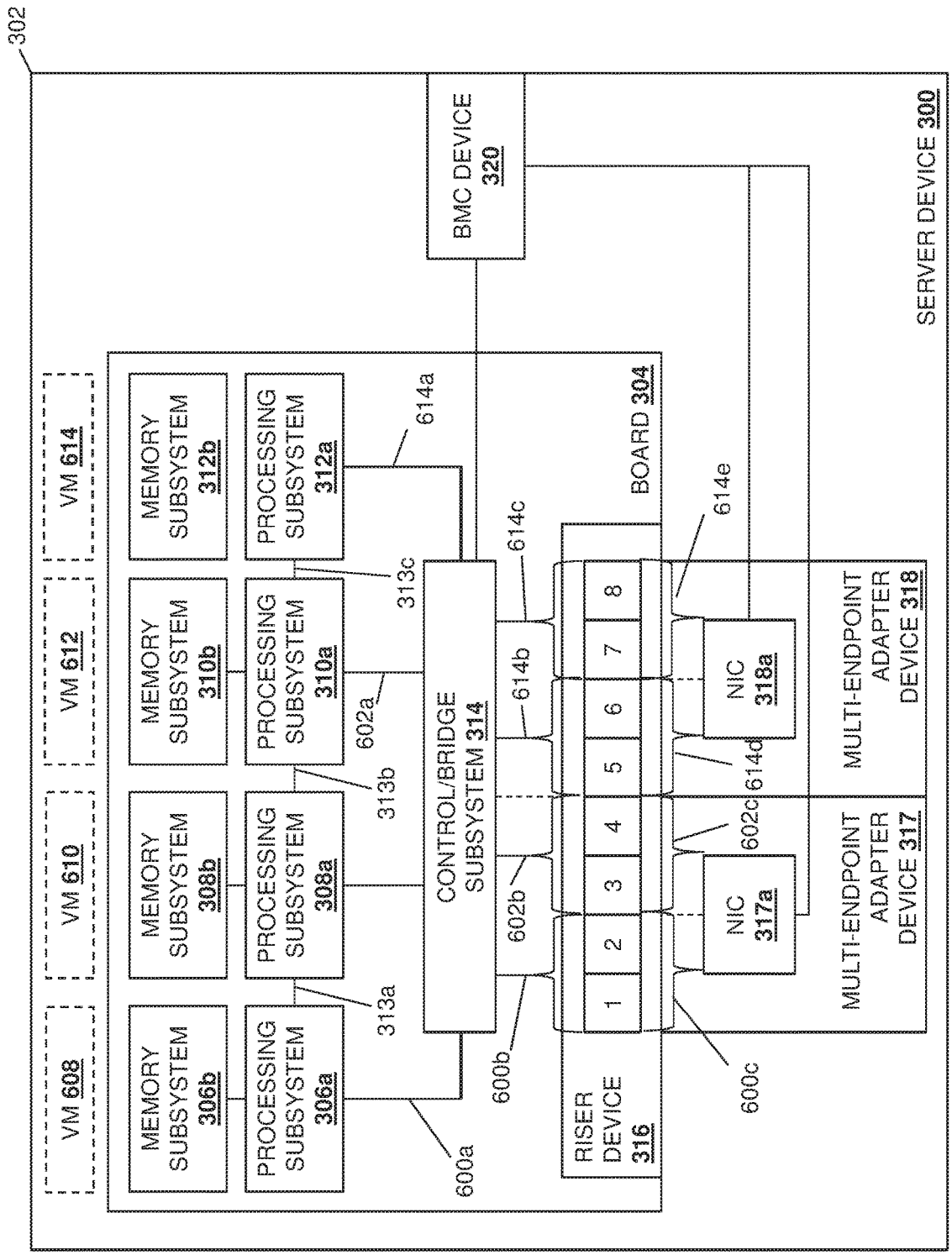
FIG. 6G is a schematic view illustrating an embodiment of a new virtual machine deployed in the virtual machine deployment system provided by the server device of FIG. 2 and during the method of FIG. 4.

In an embodiment, at block 410, the virtual machine deployment engine then deploys the virtual machine for which the deployment instruction was received at block 404 on the processing subsystem identified at block 408. At block 410, the virtual machine deployment engine may retrieve virtual machine code (for the virtual machine for which the deployment instruction was received at block 404) from, for example, the deployment instructions, a location identified in the deployment instructions, and/or from a variety of other locations that would be apparent to one of skill in the art in possession of the present disclosure. With reference to FIG. 6G, the virtual machine deployment engine may then provide that virtual machine code on the memory subsystem 312b, which allows the processing subsystem 312a to execute that virtual machine code in order to provide a virtual machine 614 (which is the virtual machine for which the deployment instruction was received at block 404.) As would be understood by one of skill in the art in possession of the present disclosure, following the deployment of the virtual machine 614, that virtual machine 614 may operate to perform a variety of virtual machine operations in a manner that satisfies its virtual machine performance requirements including, for example, communicating via software defined NIC 318a using the communication couplings 614a-614e (e.g., via the ×16 connection provided on the riser device 316 for the processing subsystem 312a).

Figure 6H:
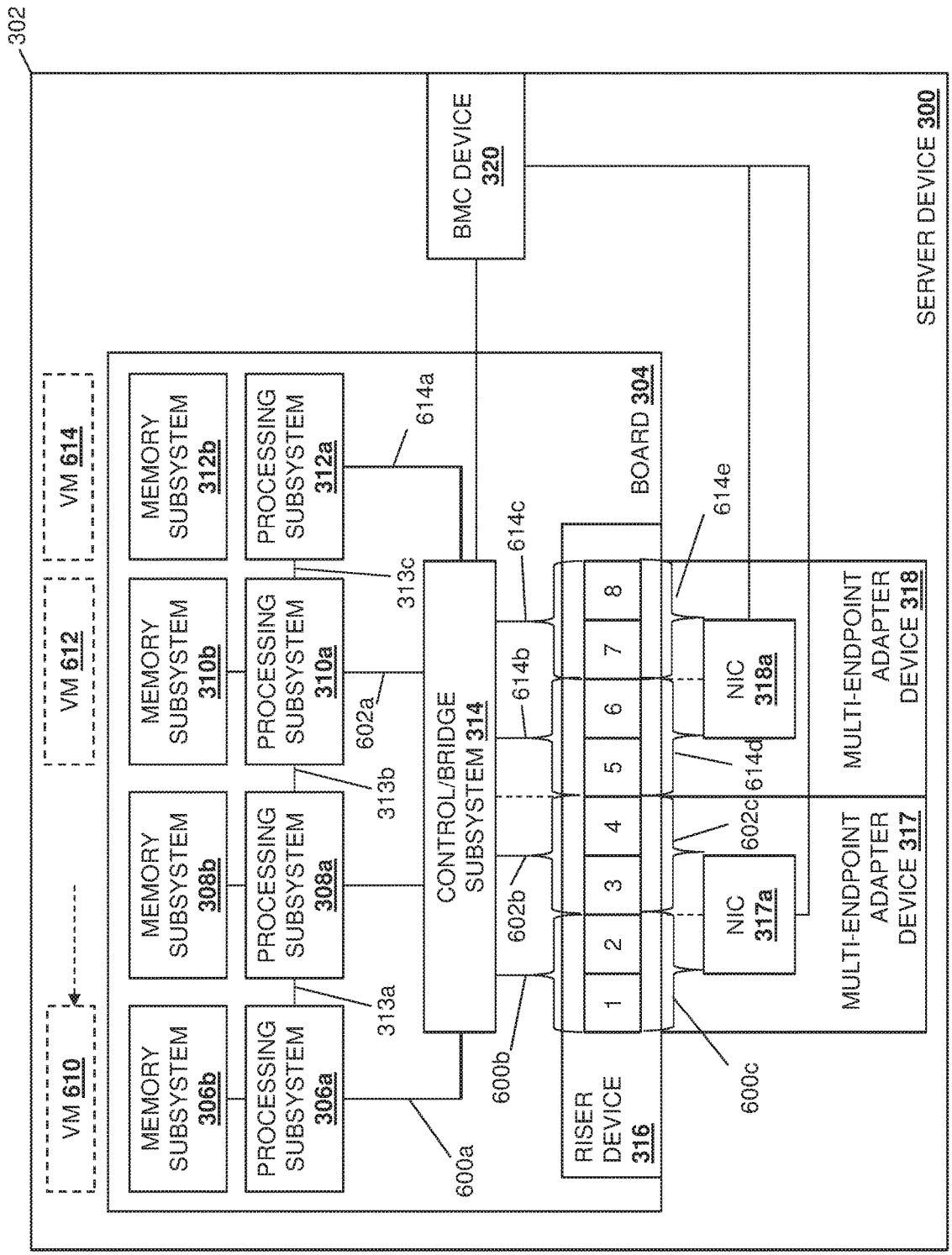
FIG. 6H is a schematic view illustrating an embodiment of the removal of a virtual machine and the moving of a virtual machine in the virtual machine deployment system provided by the server device of FIG. 2 and during the method of FIG. 4.

In some embodiments, at block 408 the virtual machine deployment engine may operate to move virtual machines between processing subsystems and/or server devices in order to, for example, ensure that the virtual machine performance requirement(s) for virtual machine(s) are satisfied. For example, with reference to the example discussed above with reference to FIGS. 6F and 6G, FIG. 6H illustrates how the virtual machine deployment engine may move the virtual machine 608 from the processing subsystem 306a and out of the service device 202a/300 to, for example, the server device 202b (e.g., by copying the virtual machine code for the virtual machine 608 from the memory subsystem 306b to a memory subsystem included in the server device 202b). Furthermore, FIG. 6H also illustrates how the virtual machine deployment engine may move the virtual machine 610 from being provided by the processing subsystem 308a to being provided by the processing subsystem 306a (e.g., by copying the virtual machine code for the virtual machine 610 from the memory subsystem 308b to the memory subsystem 306b. As such, in the event the virtual machine performance requirements for the virtual machine 610 require at least a ×8 connection to a NIC, the virtual machine 608 (which may also include virtual machine performance requirements satisfied by the components of the server device 202b) may be moved from the processing subsystem 306a to a different server device, which allows the virtual machine 610 to be moved to the processing subsystem 306a so that the virtual machine 610 may utilize the ×8 connection to the NIG 317a provided by the communication couplings 600a-c.

Thus, systems and methods have been described that provide for the deployment of a first virtual machine on a first processing subsystem that has been allocated a first subset of available communication resources with a first endpoint subsystem that satisfy at least one first communication resource requirement of that first virtual machine, thus ensuring that the provisioning of that first virtual machine by that first processing subsystem will satisfy first virtual machine performance requirements for that first virtual machine. When necessary, the deployment of the first virtual machine on the first processing subsystem may include the configuration of one or more communication couplings that couple the first processing subsystem to the first endpoint subsystem to ensure that the first processing subsystem is allocated the first subset of available communication resources with the first endpoint subsystem that satisfy the at least one first communication resource requirement of the first virtual machine, which may also include reallocating at least some communication resources that are provided to a second processing subsystem and, in some cases, moving a second virtual machine that is provided by that second processing subsystem to a different processing subsystem. As such, a more efficient deployment of virtual machines is provided that ensures the virtual machine(s) that are deployed will be able to satisfy virtual machine performance requirement(s), while also ensuring currently-deployed virtual machines utilize the available communication resources efficiently.

Furthermore, the present disclosure is being filed along with U.S. patent application Ser. No. 16/396,200, filed on Apr. 26, 2019, and directed to data splitting techniques; U.S. patent application Ser. No. 16/396,320, filed on Apr. 26, 2019, and directed to data duplicating techniques; U.S. patent application Ser. No. 16/396,453, filed on Apr. 26, 2019, and directed to packet routing techniques; U.S. patent application Ser. No. 16/395,468, filed on Apr. 26, 2019, and directed to communication coupling configuration techniques; U.S. patent application Ser. No. 16/396,521, filed on Apr. 26, 2019, and directed to connection configuration techniques; and U.S. patent application Ser. No. 16/395,584, filed on Apr. 26, 2019, and directed to sideband communication techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual machine deployment system, comprising:
a chassis;
a plurality of processing subsystems that are housed in the chassis;
at least one multi-endpoint adapter device that is housed in the chassis and that includes a plurality of endpoint subsystems;
a plurality of configurable hardware communication couplings that are housed in the chassis and that couple each of the plurality of endpoint subsystems to at least one of the plurality of processing subsystems in order to provide a respective subset of available communication resources to each of the plurality of processing subsystems;
a virtual machine deployment engine that is configured to:
receive a first instruction to deploy a first virtual machine;
determine at least one first communication resource requirement for the first virtual machine;
identify a first processing subsystem that is included in the plurality of processing subsystems and that is provided a first subset of the available communication resources that does not satisfy the at least one first communication resource requirement for the first virtual machine;
identify at least one second processing subsystem that is included in the plurality of processing subsystems and that is provided a second subset of the available communication resources that are not needed to satisfy at least one second communication resource requirement for at least one second virtual machine being provided by the at least one second processing subsystem;
reconfigure the plurality of configurable hardware communication couplings in order to provide the first processing subsystem with the second subset of the available communication resources in order to satisfy the at least one first communication resource requirement for the first virtual machine; and
deploy the first virtual machine on the first processing subsystem.

2. The system of claim 1, wherein the plurality of endpoint subsystems include a plurality of software defined Network Interface Controllers (NICs).

3. The system of claim 1, wherein the virtual machine deployment engine is configured to:

configure, prior to identifying the first processing subsystem that is provided the first subset of the available communication resources, the plurality of configurable hardware communication couplings in order to provide the first processing subsystem with the first subset of the available communication resources.

4. The system of claim 1, wherein the virtual machine deployment engine is configured to:
configure, prior to identifying the at least one second processing subsystem that is provided the second subset of the available communication resources, the plurality of configurable hardware communication couplings in order to provide the at least one second processing subsystem with the second subset of the available communication resources.

5. The system of claim 1, further comprising:
a Baseboard Management Controller (BMC) device that is configured to:
report, to the virtual machine deployment engine, a communication coupling configuration for the plurality of communication couplings that is used by the virtual machine deployment engine to identify the first processing subsystem that is provided the first subset of the available communication resources.

6. An Information Handling System (IHS), comprising:
a virtual machine deployment processing system that includes at least one hardware processor; and
a virtual machine deployment memory system that includes a non-transitory memory that is coupled to the virtual machine deployment processing system and that includes instructions that, when executed by the at least one hardware processor included in the virtual machine deployment processing system, cause the virtual machine deployment processing system to provide a virtual machine deployment engine that is configured to:
receive a first instruction to deploy a first virtual machine on one of a plurality of processing subsystems that are housed in a chassis and that are coupled to a multi-endpoint adapter device that is housed in the chassis via a plurality of configurable hardware communications couplings that are housed in the chassis;
determine at least one first communication resource requirement for the first virtual machine;
identify a first processing subsystem that is included in the plurality of processing subsystems and that is provided, via the plurality of configurable hardware communication couplings that couple the first processing subsystem to a first endpoint subsystem provided on the multi-endpoint adapter device, a first subset of available communication resources do not satisfy the at least one first communication resource requirement for the first virtual machine;
identify at least one second processing subsystem that is included in the plurality of processing subsystems and that is provided, via the plurality of configurable hardware communication couplings that couple the at least one second processing subsystem to the first endpoint subsystem provided on the multi-endpoint adapter device, a second subset of available communication resources that are not needed to satisfy at least one second communication resource requirement for at least one second virtual machine being provided by the at least one second processing subsystem;

reconfigure the plurality of configurable hardware communication couplings in order to provide the first processing subsystem with the second subset of the available communication resources in order to satisfy the at least one first communication resource requirement for the first virtual machine; and
deploy the first virtual machine on the first processing subsystem.

7. The IHS of claim 6, wherein the first endpoint subsystem includes a software defined Network Interface Controller (NIC).

8. The IHS of claim 6, wherein the virtual machine deployment engine is configured to:
configure, prior to identifying the first processing subsystem that is provided the first subset of the available communication resources, the plurality of configurable hardware communication couplings in order to provide the first processing subsystem with the first subset of the available communication resources.

9. The IHS of claim 6, wherein the virtual machine deployment engine is configured to:
configure, prior to identifying the at least one second processing subsystem that is provided the second subset of the available communication resources, the plurality of configurable hardware communication couplings in order to provide the at least one second processing subsystem with the second subset of the available communication resources.

10. The IHS of claim 6, wherein the virtual machine deployment engine is configured to:
monitor the operation of the at least one second processing subsystem in providing the at least one second virtual machine; and
determine, in response to the monitoring, that the second subset of available communication resources that are being provided to the at least one second processing subsystem are not needed to satisfy the at least one second communication resource requirement for at least one second virtual machine being provided by the at least one second processing subsystem.

11. The IHS of claim 6, wherein the virtual machine deployment engine is configured to:
receive, from a Baseboard Management Controller (BMC) device, a communication coupling configuration for the plurality of communication couplings, wherein the virtual machine deployment engine utilizes the communication coupling configuration to identify the first processing subsystem that is provided the first subset of the available communication resources.

12. A method for deploying virtual machines, comprising:
receiving, by a virtual machine deployment subsystem, a first instruction to deploy a first virtual machine on one of a plurality of processing subsystems that are housed in a chassis and that are coupled to a multi-endpoint adapter device that is housed in the chassis via a plurality of configurable hardware communications couplings that are housed in the chassis;
determining, by the virtual machine deployment subsystem, at least one first communication resource requirement for the first virtual machine;
identifying, by the virtual machine deployment subsystem, a first processing subsystem that is included in the plurality of processing subsystems and that is provided, via the plurality of configurable hardware communication couplings that couple the first processing subsystem to a first endpoint subsystem provided on the multi-endpoint adapter device, a first subset of available communication resources that do not satisfy the at least one first communication resource requirement for the first virtual machine;

identifying, by the virtual machine deployment subsystem, at least one second processing subsystem that is included in the plurality of processing subsystems and that is provided, via the plurality of configurable hardware communication couplings that couple the at least one second processing subsystem to the first endpoint subsystem provided on the multi-endpoint adapter device, a second subset of available communication resources that are not needed to satisfy at least one second communication resource requirement for at least one second virtual machine being provided by the at least one second processing subsystem;

reconfiguring, by the virtual machine deployment subsystem, the plurality of configurable hardware communication couplings in order to provide the first processing subsystem with the second subset of the available communication resources in order to satisfy the at least one first communication resource requirement for the first virtual machine; and deploying, by the virtual machine deployment subsystem, the first virtual machine on the first processing subsystem.

13. The method of claim 12, wherein the first endpoint subsystem includes a software defined Network Interface Controller (NIC).

14. The method of claim 12, further comprising:
configuring, by the virtual machine deployment subsystem prior to identifying the first processing subsystem that is provided the first subset of the available communication resources, the plurality of configurable hardware communication couplings in order to provide the first processing subsystem with the first subset of the available communication resources.

15. The method of claim 12, comprising:
configuring, by the virtual machine deployment subsystem prior to identifying the at least one second processing subsystem that is provided the second subset of the available communication resources, the plurality of configurable hardware communication couplings in order to provide the at least one second processing subsystem with the second subset of the available communication resources.

16. The method of claim 12, further comprising:
monitoring, by the virtual machine deployment subsystem, the operation of the at least one second processing subsystem in providing the at least one second virtual machine; and determining, by the virtual machine deployment subsystem in response to the monitoring, that the second subset of available communication resources that are being provided to the at least one second processing subsystem are not needed to satisfy the at least one second communication resource requirement for at least one second virtual machine being provided by the at least one second processing subsystem.

17. The method of claim 12, further comprising:
receiving, by the virtual machine deployment subsystem from a Baseboard Management Controller (BMC) device, a communication coupling configuration for the plurality of communication couplings, wherein the virtual machine deployment engine utilizes the communication coupling configuration to identify the first processing subsystem that is provided the first subset of the available communication resources.

* * * * *